United States Patent
Akahoshi et al.

(10) Patent No.: US 11,867,810 B2
(45) Date of Patent: Jan. 9, 2024

(54) DISTANCE MEASUREMENT SYSTEM AND METHOD FOR DISPLAYING DETECTION INTENSITY DISTRIBUTION OF DISTANCE MEASUREMENT SENSOR

(71) Applicant: Hitachi-LG Data Storage, Inc., Tokyo (JP)

(72) Inventors: Kenji Akahoshi, Tokyo (JP); Norimoto Ichikawa, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 225 days.

(21) Appl. No.: 17/346,409

(22) Filed: Jun. 14, 2021

(65) Prior Publication Data
US 2022/0018959 A1    Jan. 20, 2022

(30) Foreign Application Priority Data
Jul. 17, 2020 (JP) ................... 2020-122589

(51) Int. Cl.
*G01B 11/02* (2006.01)
*G01S 17/08* (2006.01)
(Continued)

(52) U.S. Cl.
CPC ............ *G01S 17/08* (2013.01); *G01B 11/026* (2013.01); *G01S 7/484* (2013.01); *G01S 7/486* (2013.01); *G01S 7/51* (2013.01)

(58) Field of Classification Search
CPC .......... G01S 17/08; G01S 7/484; G01S 7/486; G01S 7/51; G01S 7/497; G01S 17/89;
(Continued)

(56) References Cited

U.S. PATENT DOCUMENTS 6,420,698 B1 * 7/2002 Dimsdale ............. G01C 15/002
                                                                    250/234
9,165,383 B1 * 10/2015 Mendez-Rodriguez .....................
                                                                      G01C 23/00
(Continued)

FOREIGN PATENT DOCUMENTS

JP    2013-217873 A    10/2013
JP     2014-38314 A     2/2014
JP    2016-162256 A     9/2016

OTHER PUBLICATIONS

Japanese Office Action received in corresponding Japanese Application No. 2020-122589 dated Sep. 26, 2023.

*Primary Examiner* — Jonathan M Hansen
(74) *Attorney, Agent, or Firm* — MATTINGLY & MALUR, PC

(57) ABSTRACT

There is provided a distance measurement system in which a plurality of distance measurement sensors are installed to detect an object in a measurement area, the system including: a detection intensity distribution display device that performs quantification according to light intensities of light which reaches the object after being emitted from the distance measurement sensors, or point cloud numbers, and displays colors or lights and shades according to magnitudes of numerical values to perform visualization and a display. The detection intensity distribution display device regards a space in front of the distance measurement sensors as one cube, divides the cube into a plurality of small cubes (voxels), and quantifies a detection intensity according to the light intensity of the light that reaches each of the voxels after being emitted from the distance measurement sensors, or the point cloud number of each of the voxels.

17 Claims, 24 Drawing Sheets

(51) Int. Cl.
*G01S 7/51* (2006.01)
*G01S 7/486* (2020.01)
*G01S 7/484* (2006.01)

(58) Field of Classification Search
CPC ......... G01S 17/87; G01B 11/026; G01C 3/02; G01C 11/02; G01C 11/30
See application file for complete search history.

(56) References Cited

U.S. PATENT DOCUMENTS

| | | | |
|---|---|---|---|
| 2011/0115812 A1* | 5/2011 | Minear | G09G 5/02 345/593 |
| 2016/0260106 A1 | 9/2016 | Tonoike | |
| 2021/0027524 A1* | 1/2021 | Moss | G06V 10/751 |

* cited by examiner

SIDE VIEW

TOP VIEW

SIDE VIEW

TOP VIEW

SIDE VIEW

TOP VIEW

SIDE VIEW

TOP VIEW

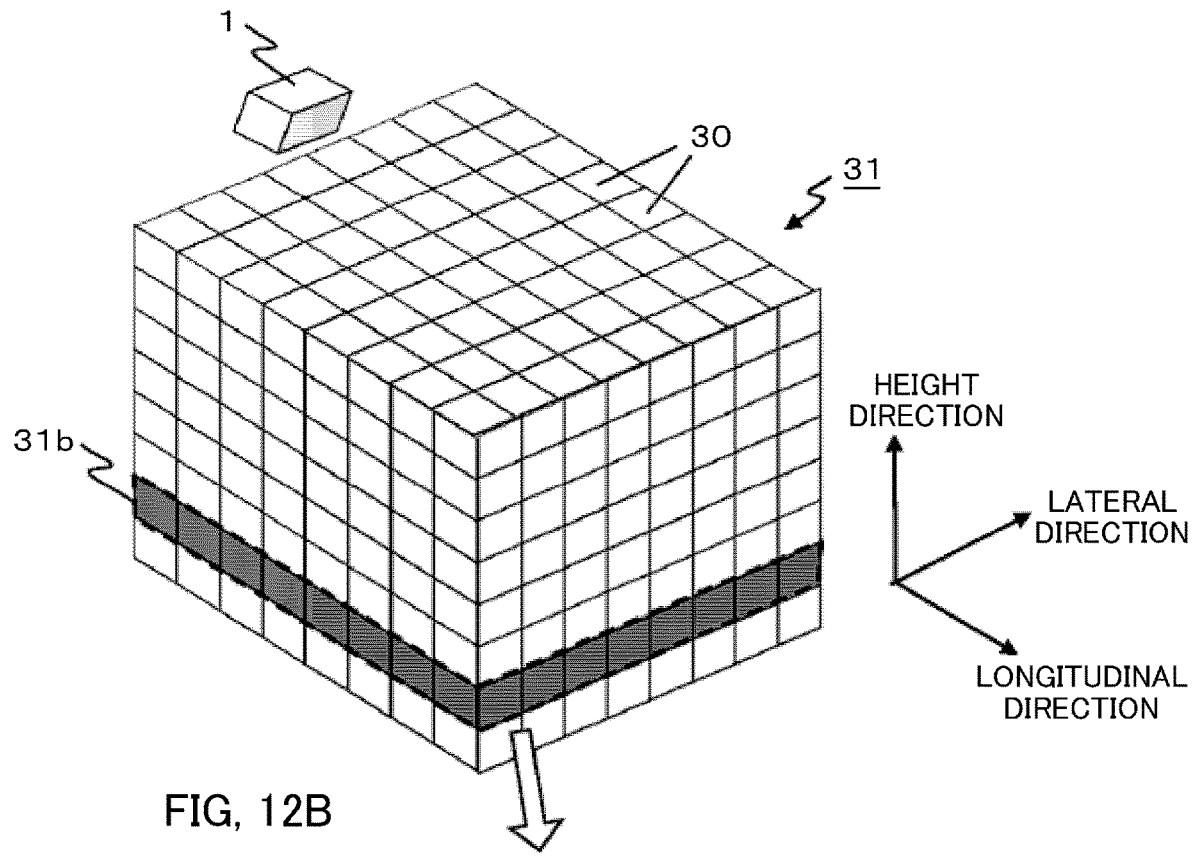

F I G. 1 3 A
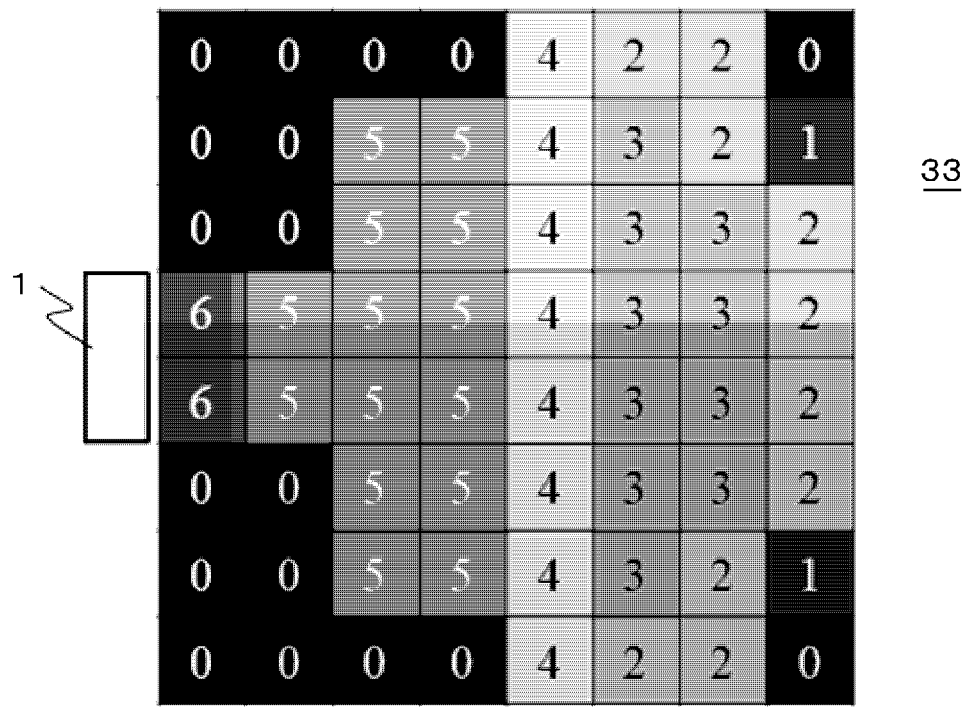
F I G. 1 3 B
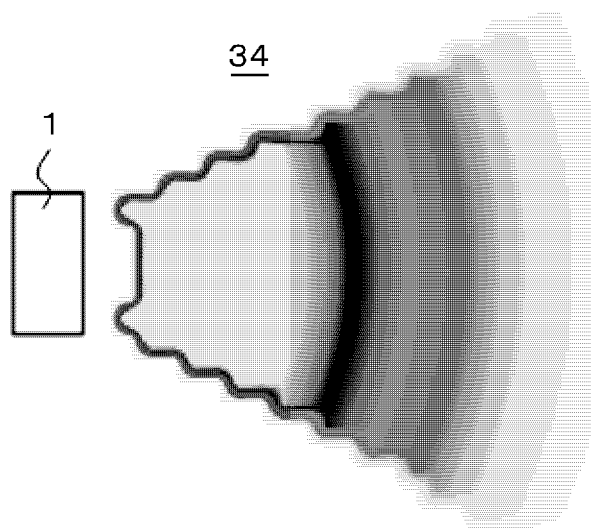
F I G. 1 3 C
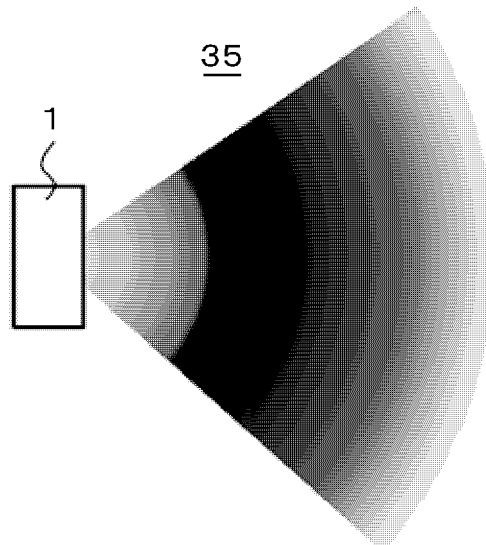

F I G. 1 4 A

OVERLAPPING BY FIVE ROWS

F I G. 1 4 B
METHOD 1
36a

F I G. 1 4 C
METHOD 2
36b

F I G. 1 4 D
METHOD 3
36c

F I G. 1 5 A
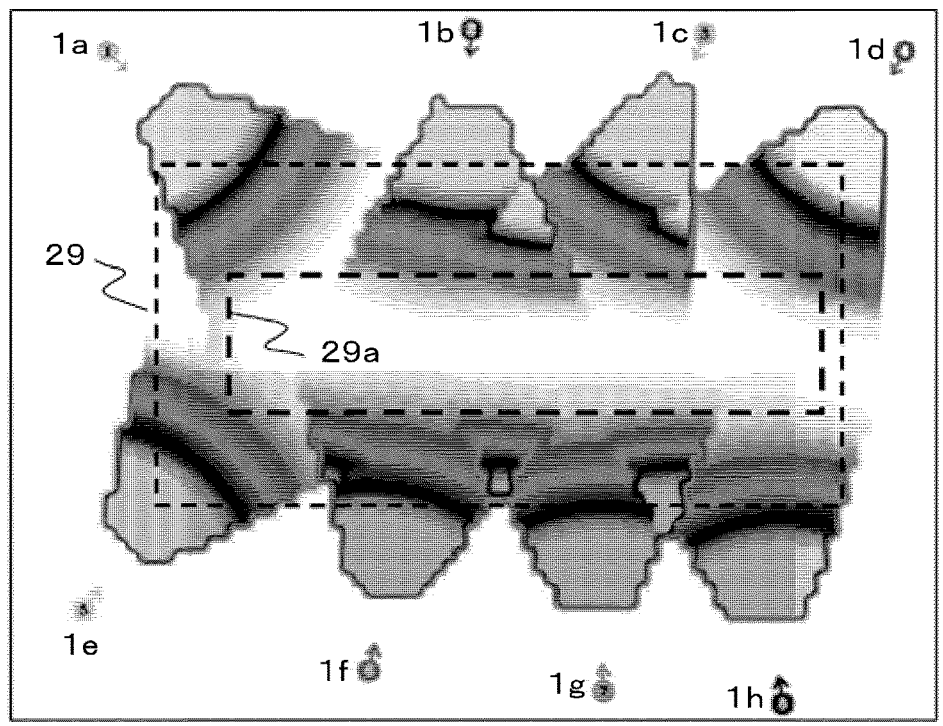
F I G. 1 5 B
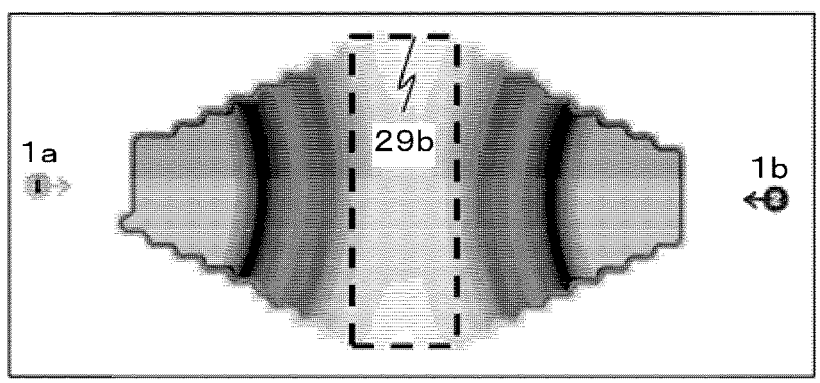
F I G. 1 5 C
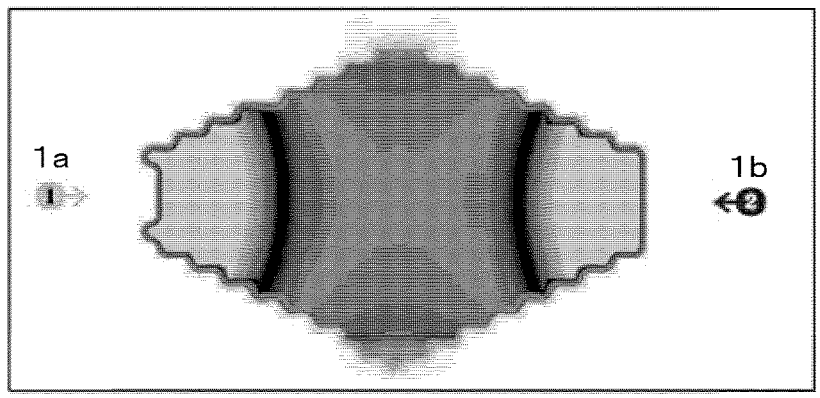

F I G. 2 2
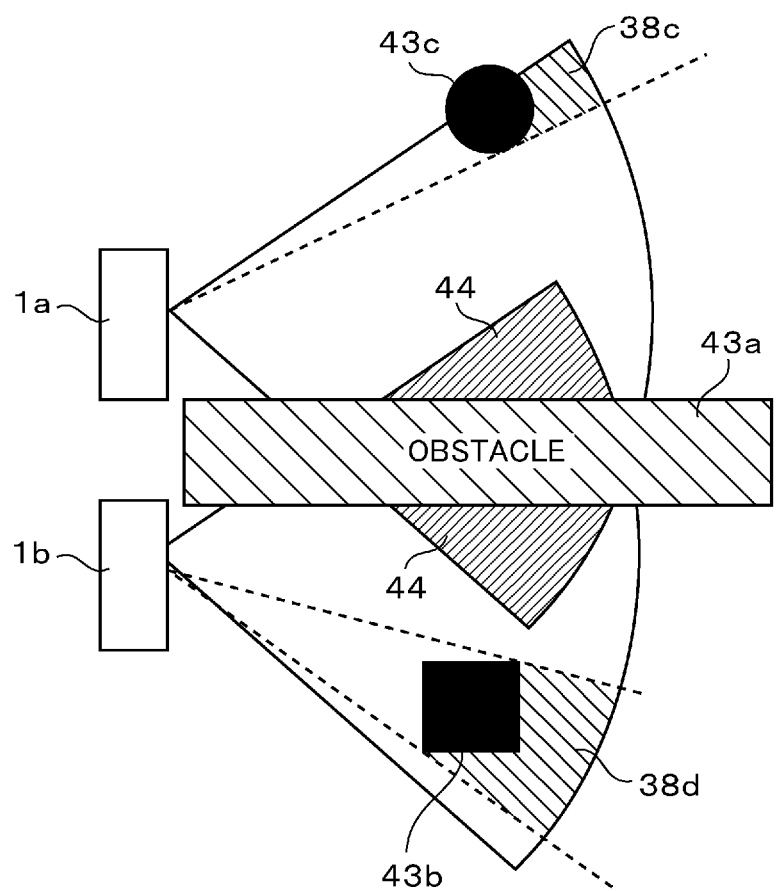

F I G. 2 3
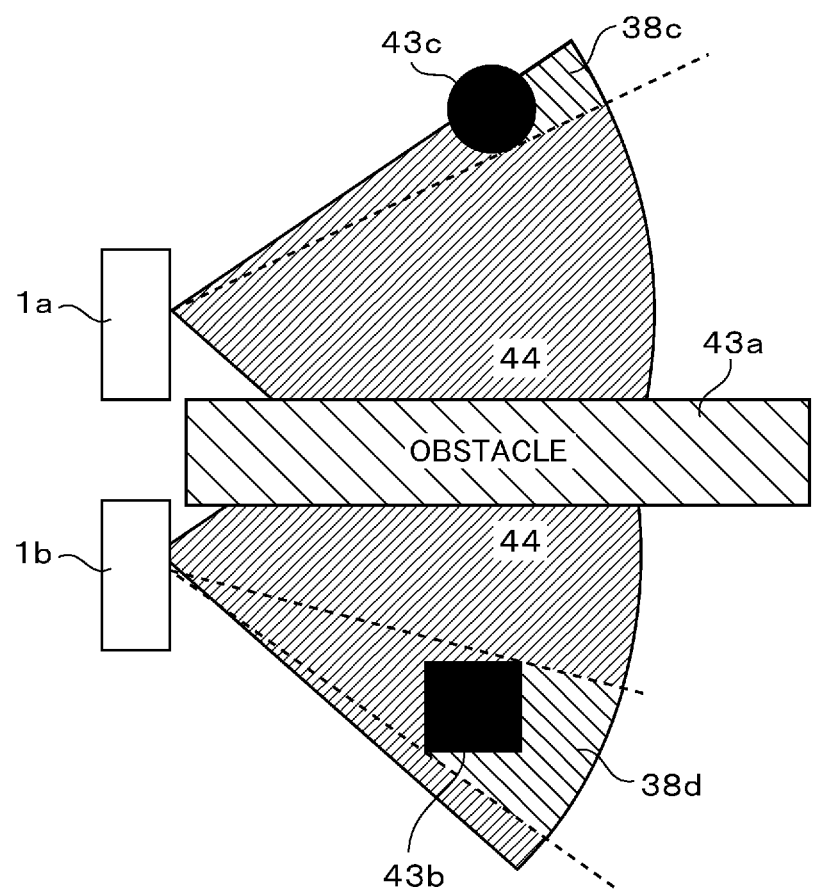

F I G. 2 4
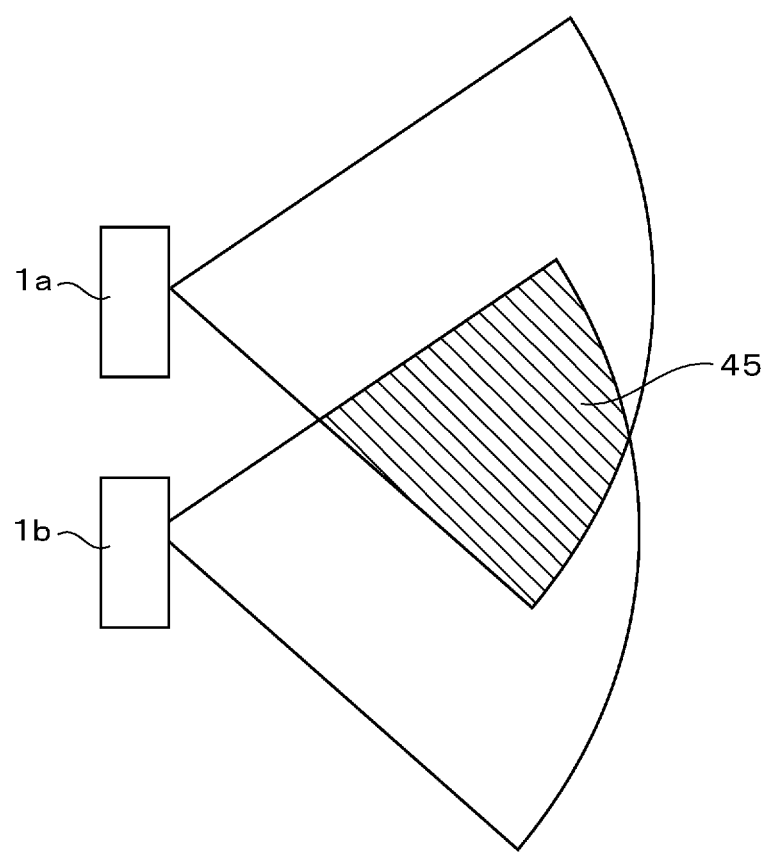

F I G. 2 6
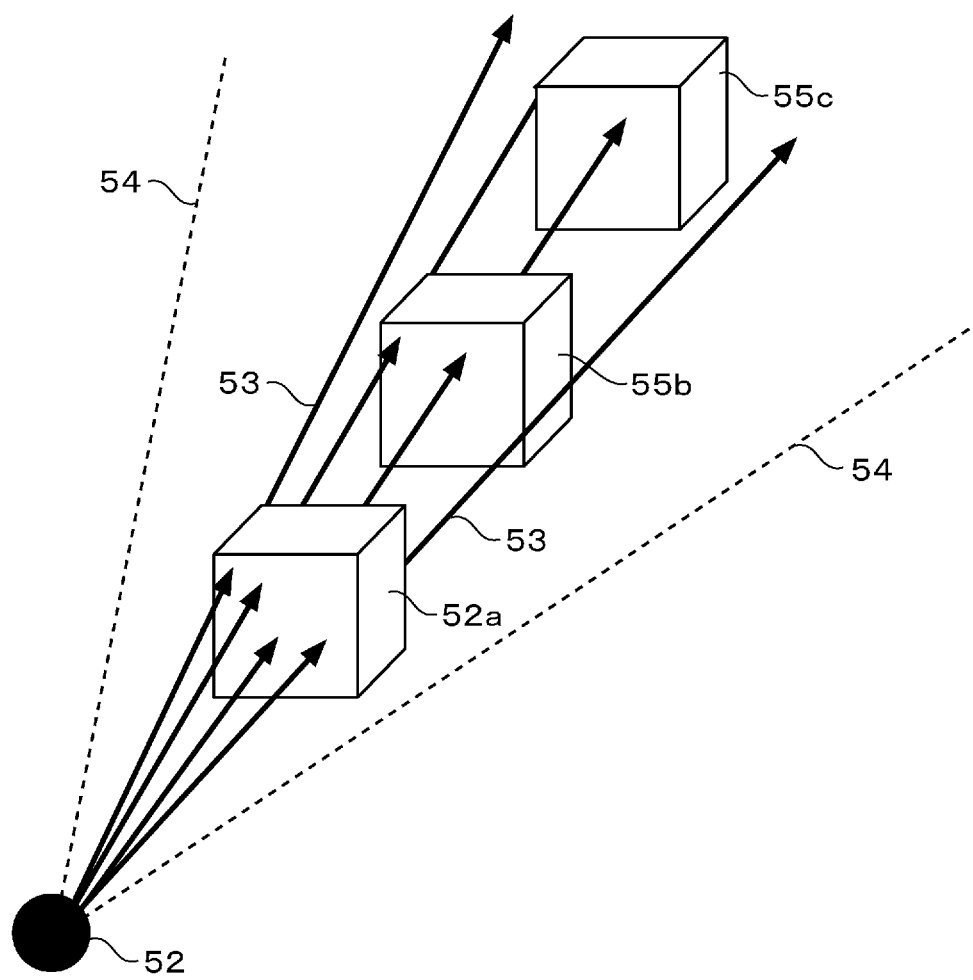

DISTANCE MEASUREMENT SYSTEM AND METHOD FOR DISPLAYING DETECTION INTENSITY DISTRIBUTION OF DISTANCE MEASUREMENT SENSOR

CROSS-REFERENCE TO RELATED APPLICATION

The present application claims priority from Japanese application JP2020-122589, filed on Jul. 17, 2020, the contents of which is hereby incorporated by reference into this application.

BACKGROUND OF THE INVENTION

1. Field of the Invention

The present invention relates to a distance measurement system that uses a distance measurement sensor to measure a distance to an object, and a method for displaying a detection intensity distribution of a distance measurement sensor.

2. Description of the Related Art

A distance measurement sensor (hereinafter, also referred to as a TOF sensor) has been known which uses a time-of-flight method (TOF method) as a method for measuring a distance to an object based on the transmission time of light or detecting the object. The movement path of, for example, a person or the like can be obtained by detecting the person or the like from the feature quantity of distance data acquired by the TOF sensor, and tracking a change over time in the detected person or the like. The principle of the TOF sensor is to calculate a distance to an object by measuring the time between the emission of irradiation light from a light source and the returning of return light to a light receiving unit after the irradiation light is reflected by the object. Since there is a limit to the distance measurable by and the viewing angle (angle of view) of one TOF sensor, when a wide space is measured, it is necessary to dispose a plurality of the TOF sensors to perform measurement.

A camera which detects the movement of a person in a room has been used in the related art, and for example, JP 2016-162256 A discloses a configuration in which a camera installed in a room to acquire the line of movement is used to unceasingly detect the line of movement of a customer.

When the camera of JP 2016-162256 A is installed, it is important to capture an image of an object, so that the camera may be installed while confirming whether or not the object can be visually observed in an image captured by the camera. However, when the TOF sensor is installed, it is important to install the TOF sensor at a position at which the distance to the object can be visualized, but it is difficult to perform installation work in a visual manner unlike a general camera. In addition, it is known that as the distance from the TOF sensor to the object increases, the detection intensity of the TOF sensor decreases, and it is difficult to perform installation work while visually confirming the detection intensity.

SUMMARY OF THE INVENTION

An object of the invention is to provide a distance measurement system and a method for displaying a detection intensity distribution of a distance measurement sensor, which can reduce a load on a worker for installation work of a plurality of distance measurement sensors and easily carry out installation work.

According to an aspect of the invention, there is provided a distance measurement system in which a plurality of distance measurement sensors are installed to detect an object in a measurement area, the system including: a detection intensity distribution display device that performs quantification according to light intensities (numerical values indicating intensities of light) of light which reaches the object after being emitted from the distance measurement sensors, or point cloud numbers (numerical values equivalent to point clouds), and displays colors or lights and shades according to magnitudes of the numerical values to perform visualization and a display. The detection intensity distribution display device regards a space in front of the distance measurement sensors as one cube, divides the cube into a plurality of small cubes (voxels), and quantifies a detection intensity according to the light intensity of the light that reaches each of the voxels after being emitted from the distance measurement sensors, or the point cloud number of each of the voxels.

In addition, according to another aspect of the invention, there is provided a method for displaying a detection intensity distribution of a distance measurement sensor, in which a detection intensity distribution of each of distance measurement sensors is quantified according to a light intensity from each of the distance measurement sensors, the light reaching the object, or a point cloud number, and is visualized and displayed by displaying colors or lights and shades according to magnitudes of numerical values. In this case, when detectable areas of a plurality of the distance measurement sensors overlap each other, numerical values at an overlapping location are multiplied by a weighting factor and are added. In addition, numerical values in an area of an obstacle and an area, in which the light is blocked by the obstacle, are defined as 0, and display levels of the colors or the lights and shades are defined as a lowest level.

The invention provides effects such as being capable of reducing a load on a worker for installation work of the distance measurement sensors, easily carrying out an optimum installation simulation before the actual installation, and easily confirming the detection intensity distribution after installation.

BRIEF DESCRIPTION OF THE DRAWINGS

FIGS. 12A and 12B are views illustrating another example of the quantification of a detection intensity distribution;

FIGS. 13A to 13C are views illustrating an example in which detection intensities are color coded (heat mapped) and displayed;

FIGS. 14A to 14D are views describing heat mapping when detectable ranges overlap each other;

FIGS. 15A to 15C are views describing effects of heat mapping;

FIG. 22 is a view illustrating a state where there is an obstacle in a detectable area;

FIG. 23 is a view describing a method for displaying a detection intensity distribution when there is an obstacle;

FIG. 24 is a view describing a display method when a plurality of distance measurement sensors interfere with each other;

FIG. 26 is a view describing that the point cloud number changes depending on the position of a voxel (third embodiment);

DETAILED DESCRIPTION OF THE PREFERRED EMBODIMENTS

Hereinbelow, embodiments of the invention will be described. In each of the following embodiments, a display of a detection intensity distribution of a distance measurement sensor will be described. The detection intensity distribution is such that numerical values indicating detection intensities according to the distances from a distance measurement sensor are assigned to a three-dimensional measurable space spreading in front of the distance measurement sensor, and a two-dimensional cross-sectional view of the three-dimensional space cut along a plane parallel to a floor surface is visualized according to the numerical values of the detection intensities.

First Embodiment

In a first embodiment, configurations of a distance measurement system and a distance measurement sensor and a basic method for displaying a detection intensity distribution will be described.

Figure 1:
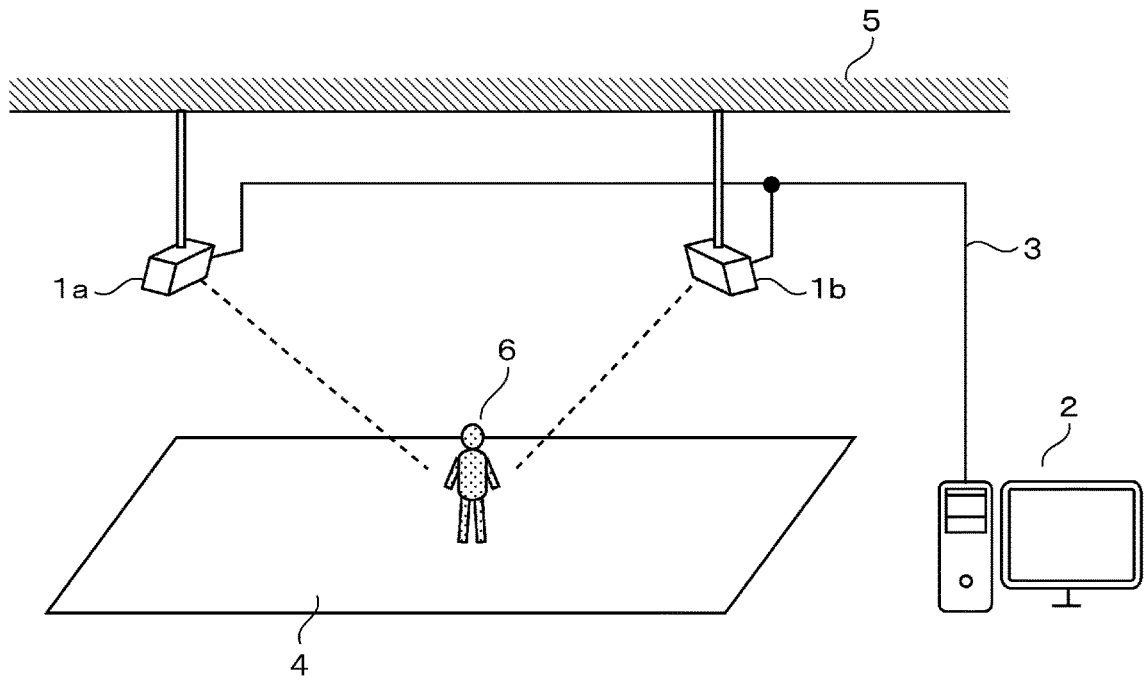
FIG. 1 is a view illustrating a configuration of a distance measurement system according to a first embodiment.

FIG. 1 is a view illustrating a configuration of the distance measurement system according to the first embodiment. The distance measurement system is configured such that a plurality of distance measurement sensors (hereinafter, also referred to as "TOF sensors" or simply as "sensors") $1a$ and $1b$ are connected to a detection intensity distribution display device 2 (hereinafter, also referred to simply as a "display device"), which displays a detection intensity distribution of the distance measurement sensors, by a network 3. For example, a personal computer (PC) or a server is used as the display device 2.

In the example illustrated in FIG. 1, two sensors $1a$ and $1b$ are attached to a ceiling 5 of a measurement space to measure a distance to an object 6 (here, a person) present on a floor surface 4, and the person 6 is detected by the two sensors. Since there is a limit to the distance measurable by or the viewing angle (determined by a vertical angle of view and a horizontal angle of view) of one sensor, when an area which is desired to be measured cannot be covered with one sensor, it is necessary to install a plurality of the sensors. In addition, it is necessary to examine how many sensors should be installed, where the installation positions should be located, and what installation directions should be taken, also in consideration of an obstacle and the like.

The detection intensity distribution display device 2 is an installation simulator that calculates and displays a detection intensity distribution in the measurement space before the distance measurement sensor is actually installed. Accordingly, it is possible to easily carry out an optimum installation simulation, and it is possible to reduce a load on a worker for installation work of the distance measurement sensors. In addition, the display device 2 has a function of displaying a distance image of an object (for example, a movement trajectory of a person) based on distance data to the object measured by the distance measurement sensor after installation.

Figure 2:
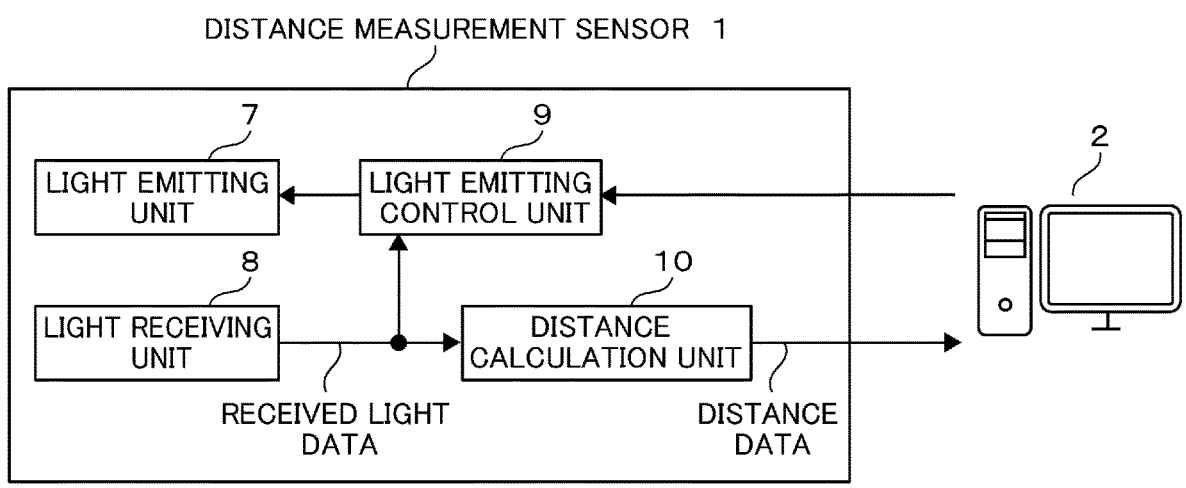
FIG. 2 is a block diagram illustrating a configuration of a distance measurement sensor (TOF sensor)

FIG. 2 is a block diagram illustrating a configuration of a distance measurement sensor (TOF sensor) 1. The distance measurement sensor 1 includes a light emitting unit that emits pulsed light which is infrared light from a light source such as a laser diode (LD) or a light emitting diode (LED); a light receiving unit 8 that receives the pulsed light, which is reflected from the object, with a CCD sensor, a CMOS sensor, or the like; a light emitting control unit 9 that controls the turning on and off of the light emitting unit 7 and the amount of emitted light; and a distance calculation unit 10 that calculates a distance to the object from a detection signal (received light data) of the light receiving unit 8. The distance data calculated by the distance calculation unit 10 is transmitted to the display device 2. In addition, the light emitting control unit 9 of the distance measurement sensor 1 starts emitting light according to a measurement command signal from the display device 2.

Figure 3:
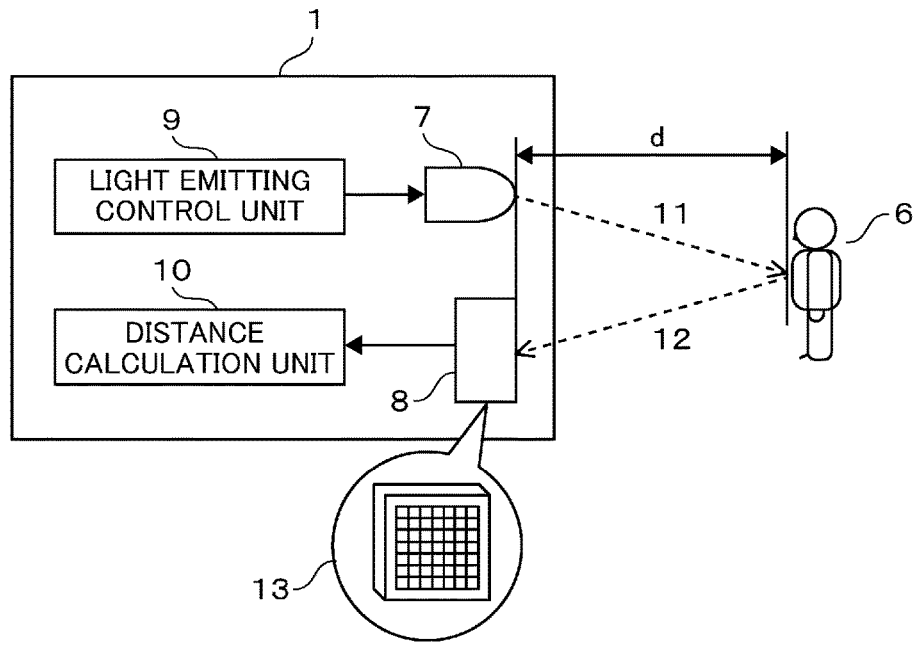
FIG. 3 is a view describing the principle of distance measurement by a TOF method.

FIG. 3 is a view describing the principle of distance measurement by a TOF method. The distance measurement sensor (TOF sensor) 1 emits irradiation light 11 for measurement of the distance from the light emitting unit 7 toward the object 6 (for example, a person). The light receiving unit 8 receives reflected light 12, which is reflected by the object 6, with a two-dimensional sensor 13. The two-dimensional sensor 13 is such that a plurality of pixels such as CCD sensors are two-dimensionally arrayed, and the distance calculation unit 10 calculates two-dimensional distance data from received light data in each of the pixels.

There is the object 6 at a position apart by a distance d from the light emitting unit 7 and the light receiving unit 8. Here, when the speed of light is defined as c, and the time difference between the emission of the irradiation light 11 from the light emitting unit 7 and the reception of the reflected light 12 by the light receiving unit 8 is defined as t, the distance d to the object 6 is obtained by d=c×t/2. Incidentally, in practical distance measurement performed by the distance calculation unit 10, instead of using the time difference t, an irradiation pulse of a predetermined width is emitted, and the two-dimensional sensor 13 receives the irradiation pulse while shifting the timing of an exposure gate. Then, the distance d is calculated from the values of the amounts of received light (accumulated amount) at different timings (exposure gate method).

Figure 4:
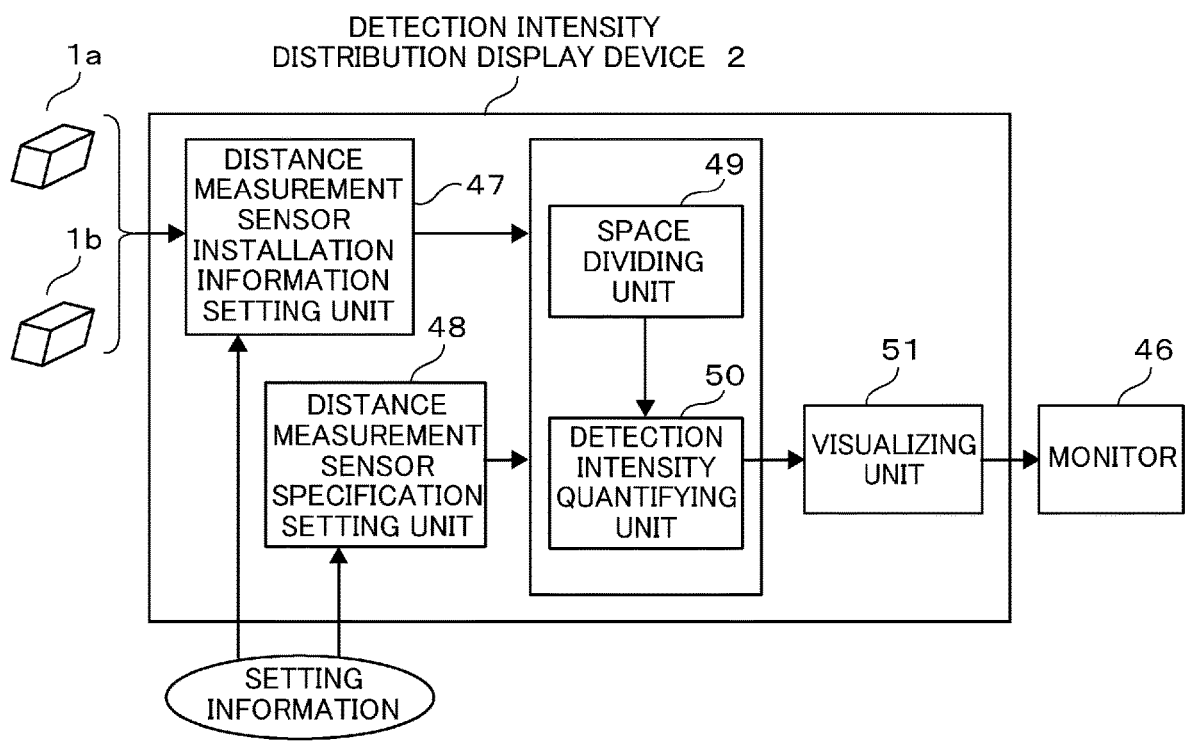
FIG. 4 is a block diagram illustrating a configuration of a detection intensity distribution display device.

FIG. 4 is a block diagram illustrating a configuration of the detection intensity distribution display device 2. The display device 2 has the following function blocks. A distance measurement sensor installation information setting unit 47 acquires installation information such as the vertical installation angle, the horizontal installation angle, and the installation height of the sensor from each of the distance measurement sensors 1a and 1b or setting information of a user. A distance measurement sensor specification setting unit 48 sets the specifications of each of the distance measurement sensors such as an angle of view, an irradiable distance, and a light source from the sensors 1a and 1b or setting information of the user. A space dividing unit 49 regards a front space as one cube, and divides the cube into a plurality of small cubes (hereinafter, referred to as "voxels") using information of the distance measurement sensor installation information setting unit 47 and the distance measurement sensor specification setting unit 48.

A detection intensity quantifying unit 50 quantifies a detection intensity in the unit of voxel using the light intensity (numerical value indicating the intensity of light) of light that reaches each voxel after being emitted from the sensors 1a and 1b, the point cloud number (numerical value equivalent to point clouds) of each voxel, both the light intensity and the point cloud number, and information of the distance measurement sensor installation information setting unit 47 and the distance measurement sensor specification setting unit 48. A visualizing unit 51 extracts planes from the cube, which are parallel to the floor surface, and visualizes the planes in colors or lights and shades according to the magnitudes of the numerical values of the detection intensities calculated by the detection intensity quantifying unit 50. Image data after visualization is displayed on a monitor 46 that is a display. Incidentally, the monitor 46 may be built in or externally attached to the display device 2. In addition to the above components, a data receiving unit which receives measurement data from each of the sensors 1a and 1b, a transmitting unit which transmits a measurement instruction signal to each of the sensors 1a and 1b, and the like are provided, but are not illustrated.

Figure 5A:
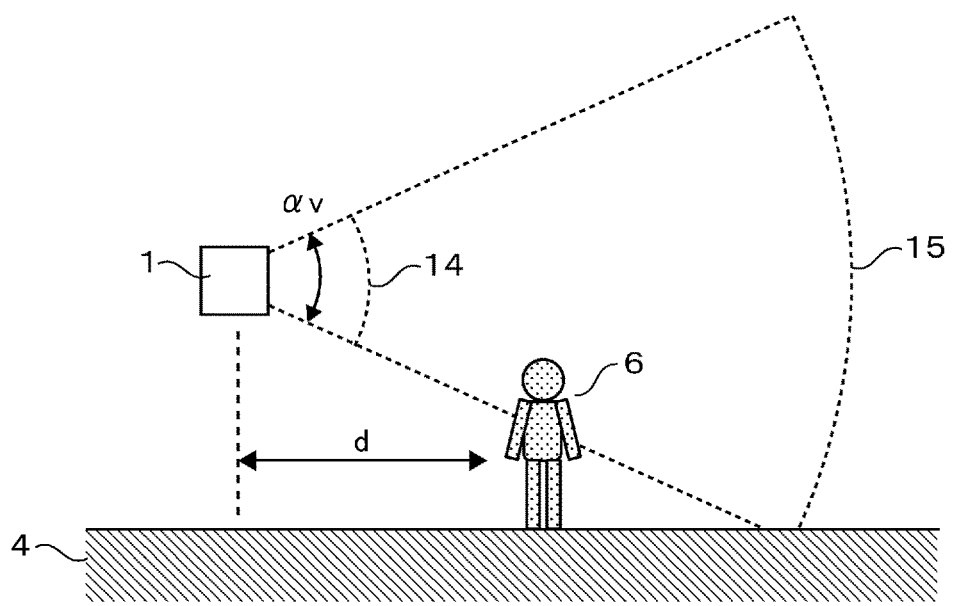
FIGS. 5A and 5B are views describing a measurable range of the distance measurement sensor.
Figure 5B:
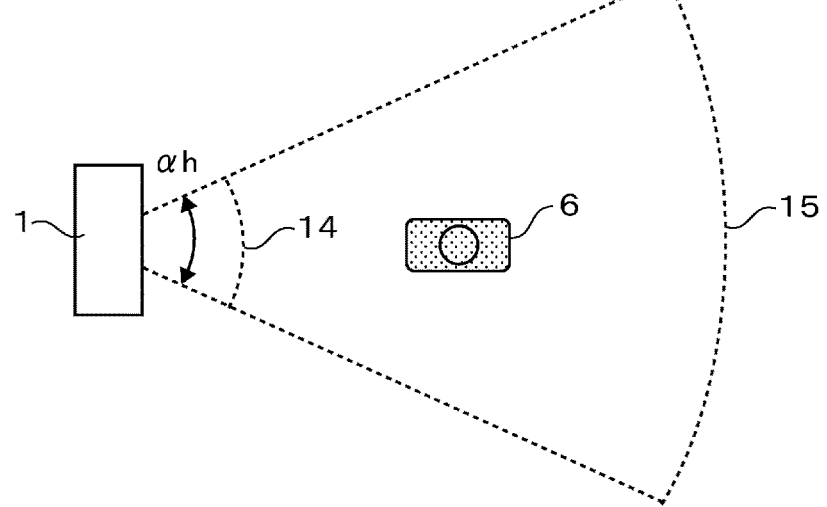

FIGS. 5A and 5B are views describing a measurable range of the distance measurement sensor 1. FIG. 5A is a side view seen from side directly parallel to the floor surface 4, and FIG. 5B is a top view of the floor surface 4 when seen directly from above. As the distance d from the distance measurement sensor 1 to the object 6 increases, the intensity of detection of the object 6 decreases, and the distance measurement sensor 1 finally cannot detect the object 6, and in that sense, there exists a maximum measurable distance line 15 measurable by the sensor. In addition, when the object 6 is in a short distance, the light receiving unit 8 may be saturated, and detection may not be possible, and in that sense, there exists a minimum measurable distance line 14 measurable by the sensor.

Further, there also exists the range of an angle (viewing angle or angle of view) measurable by the sensor, and there exist a vertical angle αv of view when seen in a lateral direction in FIG. 5A, and a horizontal angle αh of view when seen in an upward direction in FIG. 5B.

Namely, the measurable range of the distance measurement sensor 1 is a range surrounded by the minimum measurable distance line 14, the maximum measurable distance line 15, the vertical angle αv of view, and the horizontal angle αh of view. As described above, the measurable range of the distance measurement sensor 1 in terms of specifications can be obtained from the specifications (angle of view and distance) of the distance measurement sensor. When the measurable range (space) is visualized and displayed in such a manner that the measurable range is superimposed on a floor plan of a room (floor map or the like of a store) in which the distance measurement sensor 1 is to be installed, it can be visually determined whether or not an area which is desired to be detected can be covered.

Here, a "distance measurement sensor installation simulator" (hereinafter, also referred to simply as an "installation simulator") is introduced which simulates how many distance measurement sensors should be installed, where the installation positions should be located, and what installation directions should be taken. Namely, the installation simulator appropriately disposes the distance measurement sensor on the floor map of the store, and visualizes the detection range based on the specifications of the distance measurement sensor. The function of the installation simulator is implemented by the detection intensity distribution display device 2 of FIG. 4, and is operated by, for example, an application in the PC. Then, the operation may be in connection with the actual operation of the distance measurement sensor (reflecting the result of adjusting an irradiation direction in the application, displaying received data of the distance measurement sensor on the application, and the like). Alternatively, the application may independently operate only as the function of the installation simulator without connection with the distance measurement sensor.

Figure 6A:
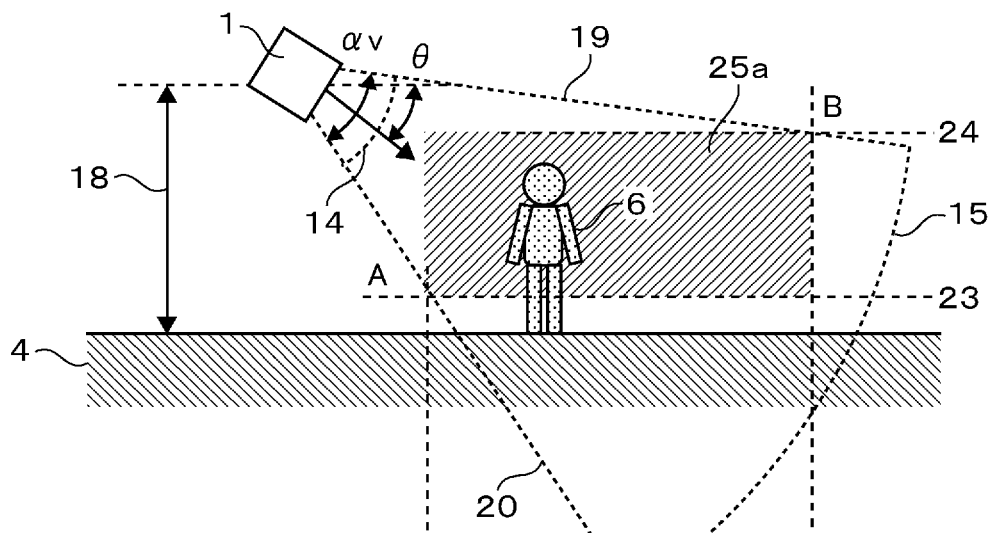
FIGS. 6A and 6B are views describing a method for displaying a detectable range of the distance measurement sensor.
Figure 6B:
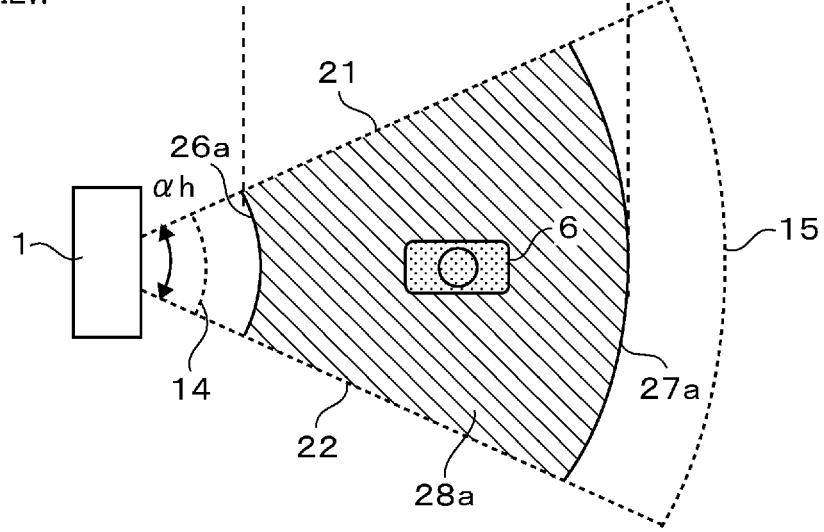

FIGS. 6A and 6B are views describing a method for displaying a detectable range of the distance measurement sensor using the distance measurement sensor installation simulator. FIG. 6A is a side view, and FIG. 6B is a top view. The detection range of the sensor is a three-dimensional space, and display in three dimensions is difficult to see, particularly when a plurality of the sensors overlap each other in three dimensions. Therefore, in order to facilitate description, a method for displaying the detection range on a two-dimensional plane seen from above will be described.

As illustrated in FIG. 6A, the distance measurement sensor 1 is installed at a position of height 18 from the floor surface 4 such that a measurement direction (direction of the center of the viewing angle) of the sensor is at a depression angle (downward angle from the horizon) of θ. A ceiling side of a measurement boundary determined by the vertical angle αv of view is defined as a boundary line 19, and a floor surface side is defined as a boundary line 20. Therefore, when the sensor 1 is seen from side, a fan shape surrounded by the boundary line 19, the boundary line 20, the minimum measurable distance line 14, and the maximum measurable distance line 15 is a measurable range. Naturally, when there is an obstacle such as the floor surface 4, a range above the floor surface 4 is a measurable range.

As illustrated in FIG. 6B, even when the distance measurement sensor 1 is overlooked from the ceiling side (upper side), similarly, a left side of a measurement boundary determined by the horizontal angle αh of view when seen from the distance measurement sensor 1 is defined as a boundary line 21, and a right side is defined as a boundary line 22. When the sensor 1 is seen from above, a fan shape surrounded by the boundary line 21, the boundary line 22, the minimum measurable distance line 14, and the maximum measurable distance line 15 is a measurable range.

Here, when the measurable range is visualized on a two-dimensional plane looking down from above, it is also necessary to take into consideration the height of the object 6 which is desired to be detected. The reason is that in order to reliably detect the object 6, the detectable height of the object 6 should be defined, a space occupied by the height should be taken into consideration, and then a range in which the object 6 can be detected (hereinafter, object detectable range) when seen from above should be determined.

Next, a method for determining the object detectable range will be described. In FIG. 6A, height levels at which the object 6 is desired to be detected are defined as a minimum height 23 and a maximum height 24. The object detectable range in which the object 6 in a range interposed between the two height levels can be detected by the sensor 1 is the range of a rectangular shape 25a (illustrated in gray) fitted in the fan shape (area surrounded by reference signs 14, 15, 19, and 20) when seen from side. In this example, the rectangular shape 25a is a shape having the following two points A and B diagonally aligned. The point A is an intersection point between the boundary line 20 and the height 23, and the point B is an intersection point between the boundary line 19 and the height 24.

FIG. 6B is a view of the object detectable range indicated by the rectangular shape 25a of FIG. 6A when overlooked from above. The boundary of the detection distance of the object 6 is a boundary line 26a and a boundary line 27a, and the object detectable range when seen from above can be indicated (illustrated in gray) by a fan shape 28a surrounded by the boundary line 21, the boundary line 22, the boundary line 26a, and the boundary line 27a. Incidentally, the object detectable range is not necessarily meant to have a fan shape, and the shape is a rectangular shape or a round shape depending on the installation angle or the installation height of the distance measurement sensor 1, and the size of the object detectable range also changes. Hereinafter, the change in shape will be described with reference to FIGS. 7A to 9B.

Figure 7A:
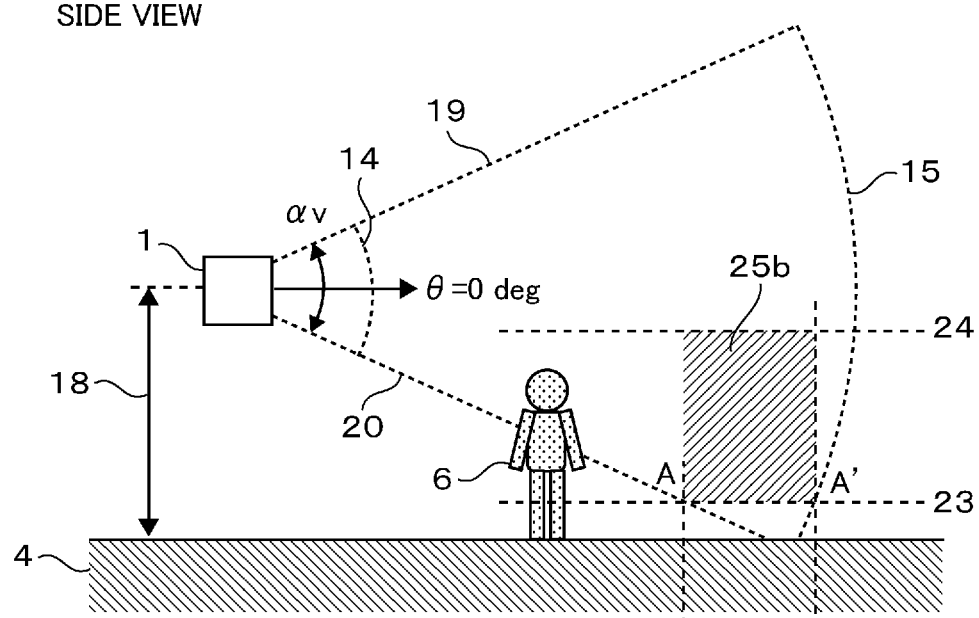
FIGS. 7A and 7B are views illustrating a display example of a detectable range of the distance measurement sensor.
Figure 7B:
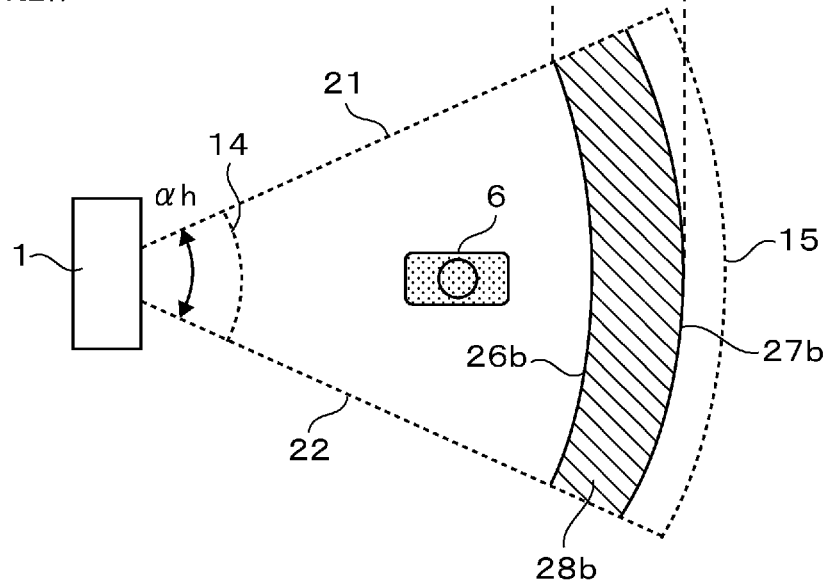

FIGS. 7A and 7B illustrate cases where the depression angle θ of installation in FIGS. 6A and 6B is 0 degrees (measurement direction is parallel to the floor surface). In this case, as illustrated in FIG. 7A, the object detectable range has a shape having the following two points A and B diagonally aligned as indicated by a rectangular shape 25b. Similar to FIGS. 6A and 6B, the point A is an intersection point between the boundary line 20 and the height 23. The point B is an intersection point between a line and the height 24, the line extending perpendicularly to the floor surface from an intersection point A' between the maximum measurable distance line 15 and the height 23.

When the range of the rectangular shape 25b is overlooked from above, as illustrated in FIG. 7B, a boundary line 26b and a boundary line 27b form the detection boundary, and the object detectable range when seen from above has a fan shape 28b (illustrated in gray) which is narrow and is surrounded by the boundary line 21, the boundary line 22, the boundary line 26b, and the boundary line 27b. It can be realized that when the installation angle of the distance measurement sensor 1 is changed as described above, the shape or size of the object detectable range is changed.

Figure 8A:
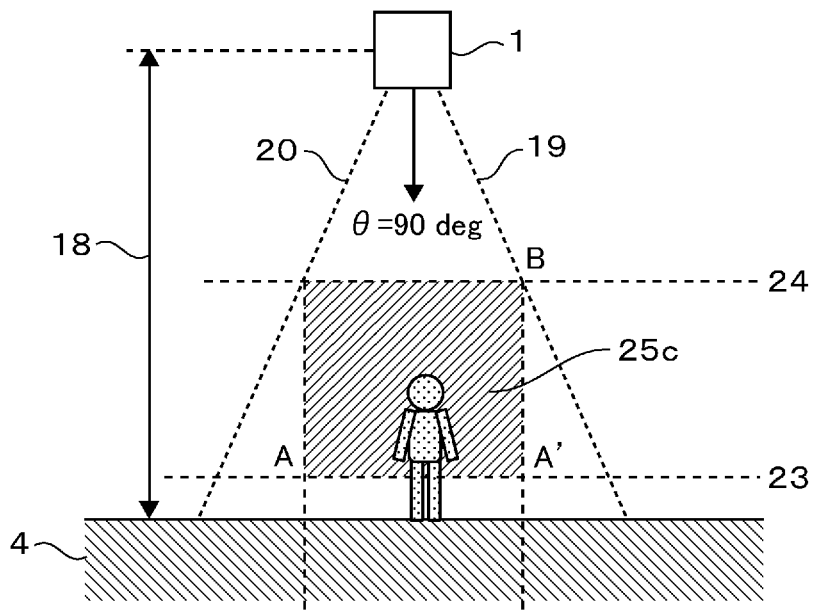
FIGS. 8A and 8B are views illustrating a display example of a detectable range of the distance measurement sensor.
Figure 8:
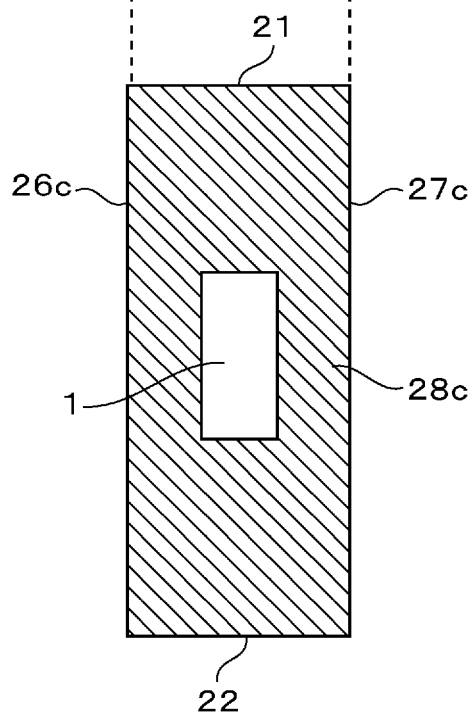

FIGS. 8A and 8B illustrate cases where the depression angle θ of installation in FIGS. 6A and 6B is 90 degrees (measurement direction is perpendicular to the floor surface). In this case, as illustrated in FIG. 8A, the object detectable range has a shape having the following two points A and B diagonally aligned as indicated by a rectangular shape 25c. The point A is an intersection point between a vertical line, which extends from an intersection point between the boundary line 20 and the height 24 to the floor surface, and the height 23. The point B is an intersection point between the boundary line 19 and the height 24.

When the range of the rectangular shape 25c is overlooked from above, as illustrated in FIG. 8B, a boundary line 26c and a boundary line 27c form the detection boundary, and the object detectable range when seen from above has a rectangular shape 28c (illustrated in gray) surrounded by the boundary line 21, the boundary line 22, the boundary line 26c, and the boundary line 27c. When the installation angle of the distance measurement sensor 1 is changed as described above, the shape of the object detectable range may be changed to a rectangular shape instead of a fan shape.

Figure 9A:
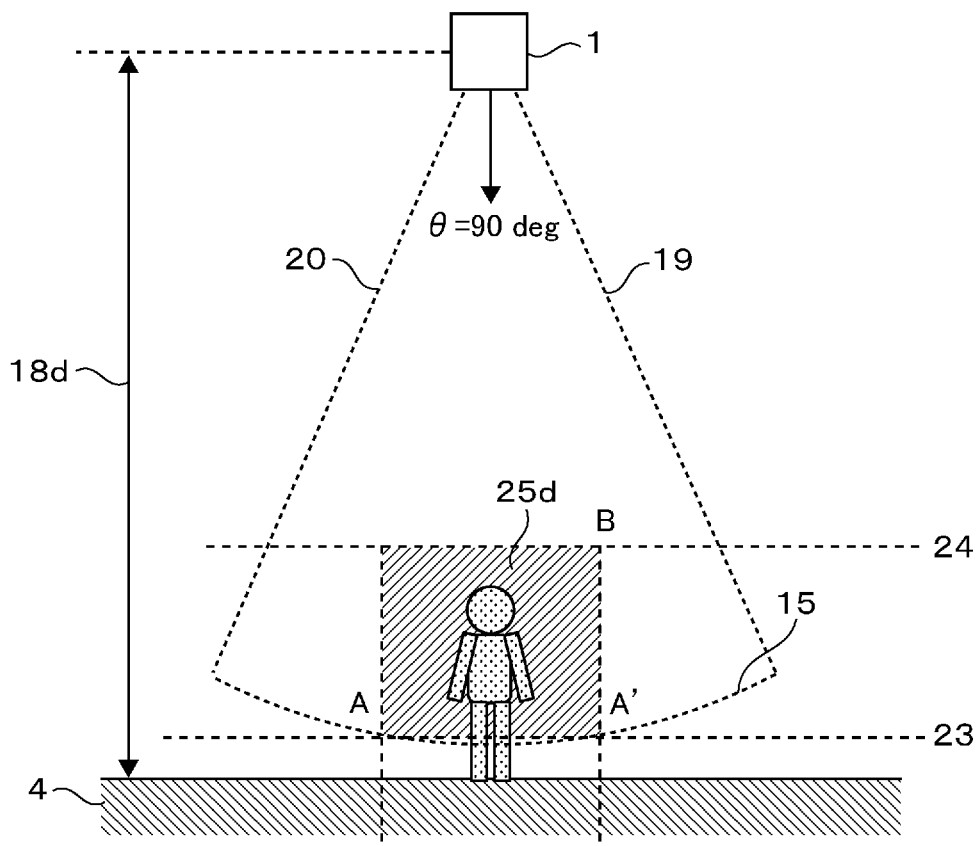
FIGS. 9A and 9B are views illustrating a display example of a detectable range of the distance measurement sensor.
Figure 9B:
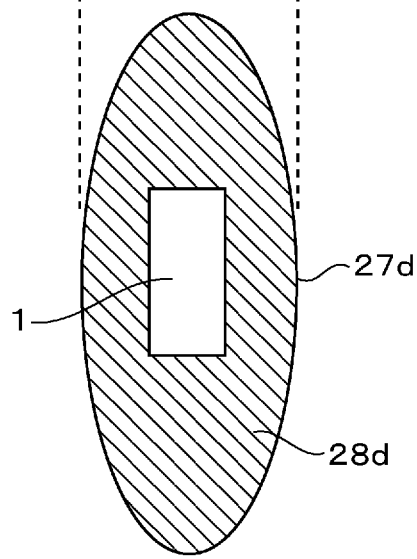

FIGS. 9A and 9B illustrate cases where the depression angle θ of installation is 90 degrees, which is the same as that in FIGS. 8A and 8B, and an installation height 18d is higher than that in FIGS. 8A and 8B. In this case, the object detectable range has a shape having the following two points A and B diagonally aligned as indicated by a rectangular shape 25d of FIG. 9A. The point A is one intersection point between the maximum measurable distance line 15 and the height 23. The point B is an intersection point between a line and the height 24, the line extending directly upward from the other intersection point A' between the maximum measurable distance line 15 and the height 23.

When the range of the rectangular shape 25d is overlooked from above, as illustrated in FIG. 9B, the object detectable range has a circular shape (elliptical shape) 27d (illustrated in gray). The reason is that a group of the maximum measurable distance lines 15 form a curved surface, and are cut into a shape that slices the curved surface horizontally with respect to the floor surface. When the installation height 18d of the distance measurement sensor 1 is changed as described above, the shape of the object detectable range may be changed to an elliptical shape instead of a fan shape or a rectangular shape.

As described above with reference to FIGS. 7A to 9B, the object detectable range has various shapes depending on the installation angle, the installation height, or the like of the distance measurement sensor, and in the following description, as illustrated in FIG. 6B, a case where the object detectable range 28a looking down from above has a fan shape will be described as an example.

Next, how to display an object detectable range in the actual installation simulator will be described.

Figure 10A:
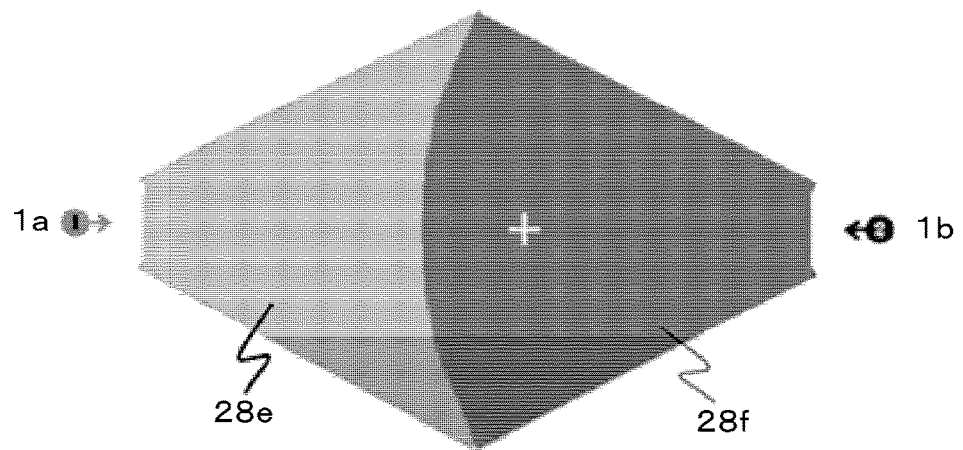
FIGS. 10A and 10B are views illustrating an example of a detectable range when a plurality of distance measurement sensors are disposed.
Figure 10B:
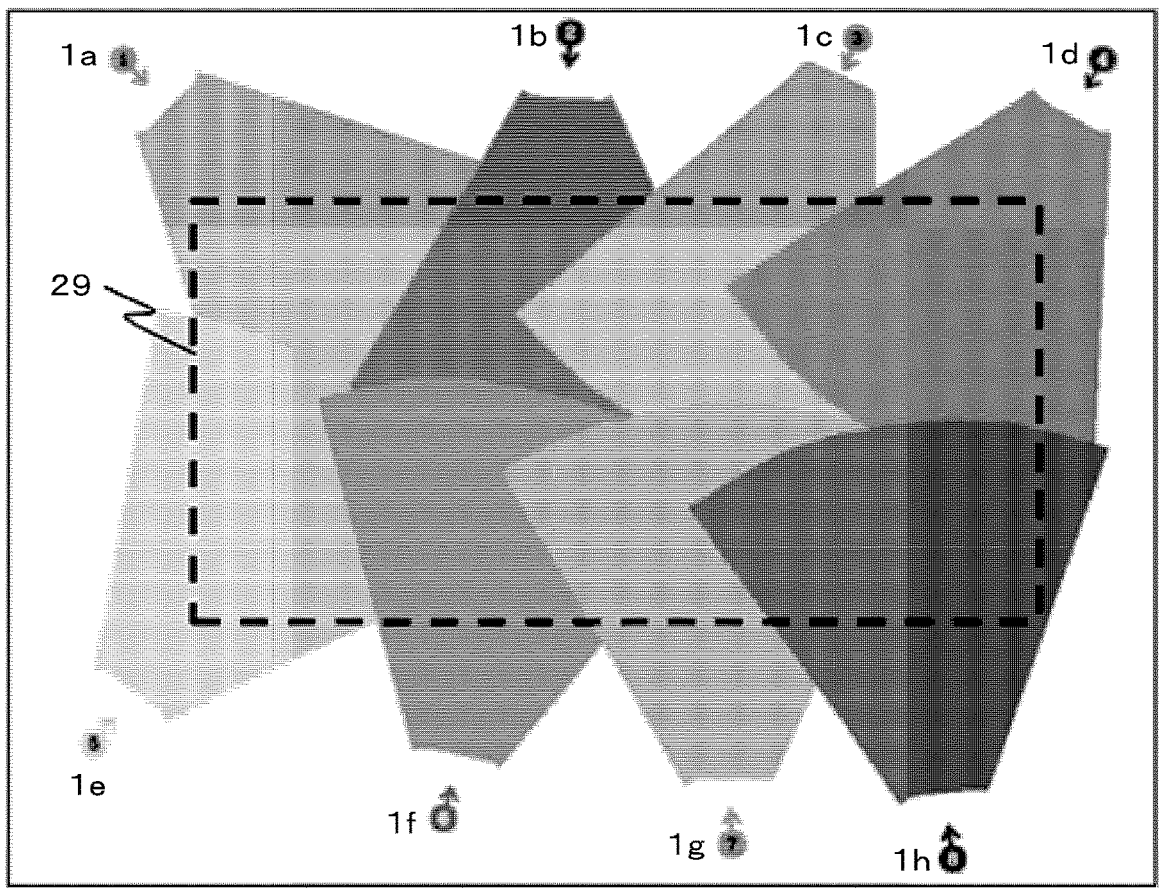

FIGS. 10A and 10B are views illustrating an example of an object detectable range when a plurality of distance measurement sensors are disposed. FIG. 10A illustrates an example in which the distance measurement sensor 1a and the distance measurement sensor 1b are disposed to face each other. In this case, fan shapes indicating the ranges (ranges seen from above) which can be detected by the sensors are 28e and 28f. Here, the range 28f overlaps the range 28e, and thus a part of the range 28e is hidden, but the range 28e also has a fan shape.

FIG. 10B illustrates a case where eight distance measurement sensors 1a to 1h are disposed in the measurement space. When the inside of an area 29 which has a rectangular shape and is surrounded by a dotted line is desired to be reliably detected, if the positions or the angles of the sensors are adjusted to cover the area 29 with fan shapes such that a gap cannot be seen in the area 29, detection can be performed without omissions, and whether or not there is a gap can be figured out on the simulator before disposition is actually performed.

However, as the distance from the distance measurement sensor to the object increases, the detection intensity decreases. Therefore, as the distance from the sensor to the fan shape increases, the detection intensity in the area of the fan shape decreases. Therefore, even when the area 29 is fully covered with the fan shapes, it may not be actually possible to favorably perform detection at positions far from the sensors. Further, as will be described later, as the distance from the sensor to each voxel increases, the point cloud number per voxel decreases, so that the detection intensity decreases.

Therefore, in an expression method for displaying the detectable range using the specifications of the sensor (viewing angle and measurable distance) as illustrated in FIGS. 10A and 10B, it is not possible to perform visualization including the detection intensity. Therefore, a method for quantifying and visualizing the detection intensity will be described below. The detection intensity is affected by the light intensity reaching the voxel and the point cloud number per voxel. In order to facilitate understanding, first, the light intensity and the detection intensity will be described.

Figure 11A:
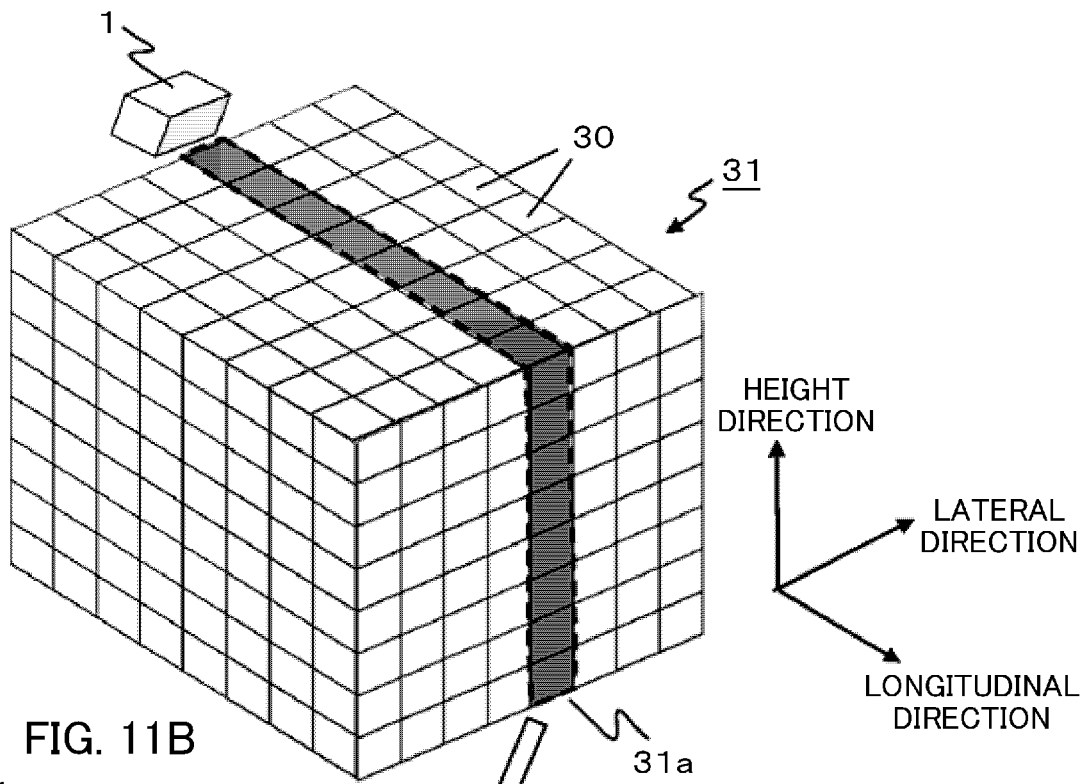
FIGS. 11A and 11B are views describing a method for quantifying a detection intensity distribution using voxels.
Figure 11B:
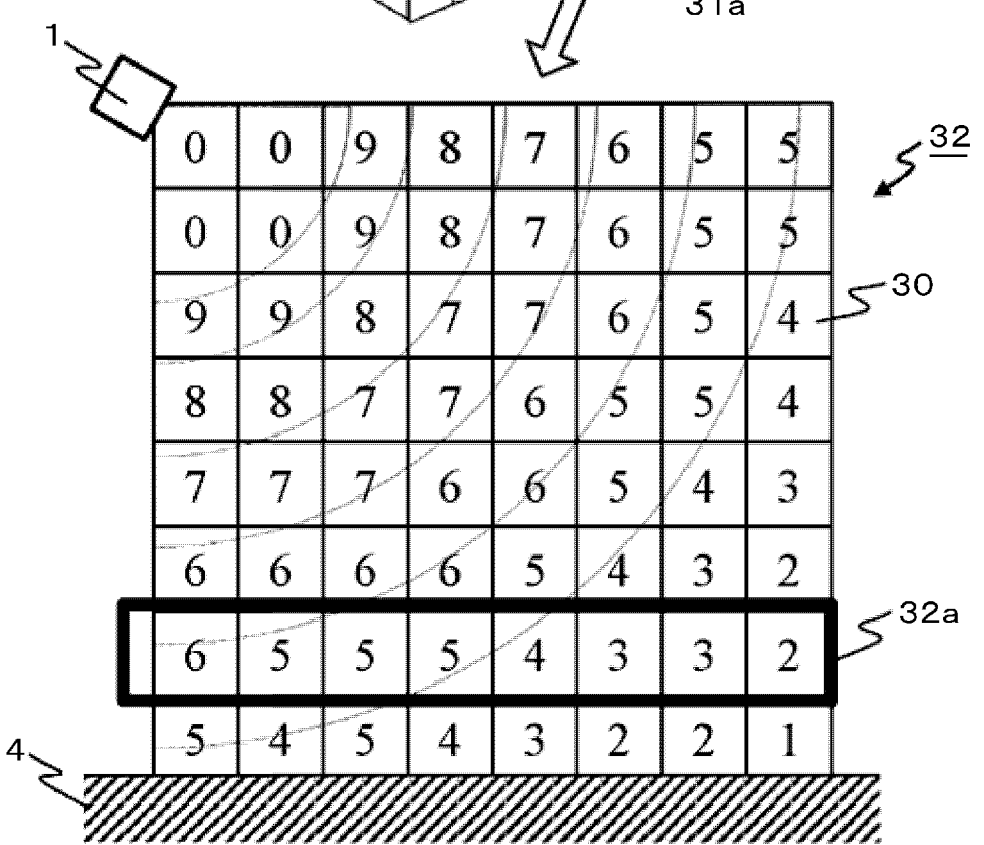

FIGS. 11A and 11B are views describing a method for quantifying a detection intensity distribution in the measurement space using voxels. FIG. 11A is a perspective view, and FIG. 11B is a longitudinal cross-sectional view. As illustrated in FIG. 11A, small cubes (voxels) 30 each having a predetermined length in front of the distance measurement sensor 1 are stacked to form a cube 31 that is large and is a combination of a plurality of the voxels 30. A numerical value indicating a detection intensity is assigned to each of the voxels 30 forming the cube 31, which is large, according to the distance from the distance measurement sensor 1 to the position of each of the voxels 30 (for example, the position of center of gravity of each voxel). In the example of FIG. 11A, the cube 31 which is large includes 512 voxels 30 of 8 pieces longitudinally×8 pieces laterally×8 pieces in height.

FIG. 11B illustrates an example of a cross-sectional view 32 of the cube 31. For example, the cross-sectional view 32 is a cross-sectional view of the voxels 30 of 8×8 pieces in longitudinal and height directions when seen from the lateral direction, the voxels 30 being extracted at a cross-sectional position 31a (fifth from the left in the lateral direction) of the cube 31 of FIG. 11A. A numerical value indicating the detection intensity is given to each of the voxels 30 according to the distance from the distance measurement sensor 1. If a method for assigning the numerical values is described with reference to FIG. 3, since the irradiation light 11 from the sensor 1 is attenuated by the square of the distance travelled until the irradiation light 11 reaches the object 6, and the reflected light 12 received by the light receiving unit 8 of the sensor is proportional to the intensity of the irradiation light, when the irradiation light is strong, the received light is also strong, and the object 6 is easily detected. Namely, in order to quantify the detection intensity of the distance measurement sensor 1, the intensity of irradiation light in the object 6 may be quantified.

Since the intensity of light is attenuated by the square of the distance d from the light source, the numerical value indicating the intensity of light can be calculated by (maximum measurable distance-d)^2 (square) or the like (here, when d exceeds the maximum measurable distance, the light intensity=0). Meanwhile, the calculation method is not limited thereto, and may be determined according to product specifications or environment. Incidentally, the numerical values of light intensities used in the following examples including the examples of FIGS. 11A and 11B are assigned simple numerical values (for example, integers of 0 to 10) that facilitates describing the operation in the embodiment, but are values proportional to the magnitudes of actual detection intensities (light intensities). In the example of the cross-sectional view 32 of FIG. 11B, the maximum value is a light intensity of 9, and the minimum value is a light intensity of 0. In the above description, the example of one light source has been illustrated, and when the distance measurement sensor includes a plurality of light sources, numerical values are calculated in consideration of an influence from each of the light sources, and the sum of the numerical values is a numerical value assigned to the voxel 30.

FIG. 12 are views illustrating another example of the quantification of a detection intensity distribution. FIG. 12A is a perspective view, and FIG. 12B is a lateral cross-sectional view. Here, the selection of an area (cross section) to be displayed will be described. FIG. 12A illustrates the same cube 31 as that in FIGS. 11A and 11B, and as illustrated in FIG. 12B, a voxel group at a predetermined height from the floor surface 4 is extracted in parallel to the floor surface. For example, a cross-sectional view 33 of FIG. 12B is a view of all the voxels at a height position 31b of the second stage from the bottom, which are extracted and arranged side by side, when seen from above. Incidentally, the cross-sectional view 33 corresponds to a portion surrounded by a frame 32a in the cross-sectional view 32 of FIG. 11B.

In the cross-sectional view 33 of FIG. 12B, the numerical value of each voxel (square) is given according to the distance from the distance measurement sensor 1, and a user can figure out the distribution of detection intensities by confirming the numerical values. Incidentally, the height of extraction can be selected by the user, and the voxels at a height according to the height of an object which is desired to be detected may be extracted. In addition, there are various methods for determining the numerical values represented by the cross-sectional view 33, such as obtaining the cross-sectional view 33 by extracting the voxels, for example, at the heights of the second stage and the third stage from the bottom and taking the average value of two numerical values, or obtaining the cross-sectional view 33 by extracting the voxels having the lowest numerical values in the height direction, instead of extracting a surface at one location.

Next, how to visualize and display the numerical values of detection intensities obtained above will be described.

FIGS. 13A to 13C are views illustrating an example in which color coding and a display are performed according to the numerical values of the detection intensities. FIG. 13A illustrates an example in which each voxel in the cross-sectional view 33 of FIG. 12B is color coded. In this example, a gray scale (lights and shades) notation is used, and it is easier to visually recognize the distribution of the detection intensities than when only the numerical values are displayed as illustrated in FIG. 12B. Certainly, when a color notation is used, it is easier to visually recognize the detection intensity distribution. Incidentally, a color scheme according to the numerical values may be either colors or black and white, and either would be used as long as a user can visually determine the strength and weakness of the detection intensities. In addition, the threshold value of the strength and weakness (threshold value of a change in color) differs depending on the specifications of the sensor. Hereinafter, the visualization of the detection intensities in colors or lights and shades according to the numerical values is referred to as heat mapping of the detection intensities.

In addition, FIGS. 13B and 13C are views illustrating another example of heat mapping. A fan shape 34 of FIG. 13B is an expression in which the detection intensities of the fan shape 28e of FIG. 10A are quantified and heat mapped according to the magnitudes of the numerical values. Here, the numerical value of each voxel is not displayed. Incidentally, since the fan shape 34 is an illustration of the monochromization of detection intensities originally noted in colors, there seems to be unevenness in lights and shades of black and white, but the numerical values change continuously. Meanwhile, a fan shape 35 of FIG. 13C is originally noted in monochrome, and is illustrated in gradation in which lights and shades of black and white change continuously. As described above, it is possible to visualize the detection intensities according to the distances from the distance measurement sensor by quantifying the light intensities in the unit of voxel according to the distances, and expressing the light intensities in colors or lights and shades.

FIGS. 14A to 14D are views describing a method for noting the heat mapping of detection intensities when the detectable ranges of a plurality of sensors overlap each other. FIG. 14A illustrates the disposition of the two distance measurement sensors 1a and 1b and the overlapping of the detectable ranges. The two sensors are assumed to have the same detection intensity distribution as that illustrated in the cross-sectional view 33 of FIG. 12B. In this example, a cross-sectional view 33a (8×8 squares) of the sensor 1a and a cross-sectional view 33b (8×8 squares) of the sensor 1b overlap each other by five rows, and the two sensors together form a cross-sectional view of 11×8 squares. Regarding a method for calculating the numerical value of a detection intensity in each square, a numerical value in a non-overlapping square which is generated by a single sensor is used as it is, and numerical values in an overlapping square which are generated by the two sensors are simply added together. FIG. 14A illustrates numerical values before addition, and FIGS. 14B to 14D illustrate numerical values after addition.

Three methods (methods 1 to 3) for noting heat mapping when the detectable ranges overlap each other can be considered, and will be described with reference to FIGS. 14B to 14D.

In FIG. 14B, method 1 will be described with reference to a cross-sectional view 36a. First, it is assumed that colors indicating detection intensities are defined, for example, in 10 levels (levels 1 to 10). The lowest level 1 is assigned a numerical value of 0, and the highest level 10 is assigned the maximum value of numerical values in distance measurement sensors disposed in the same area. Namely, when the maximum value is changed by the addition of the numerical values, the display level to which another numerical value is assigned is changed by the numerical value of the maximum value. For example, the detection intensities for which the maximum value of the numerical values is 9, the minimum value is 0, and other values are distributed from 1 to 8 are heat mapped, all the colors of 10 levels are displayed. Thereafter, when the maximum value of the numerical values is changed from 9 to 1,000 due to overlapping, the lowest numerical value is 0, and the other numerical values are not changed from 1 to 8, the square having the maximum value of 1,000 of the numerical values is displayed at the highest level 10 as it is when the numerical value is 9, and the other numerical values of 1 to 8 are noted as being equivalent to approximately the level 1 (the reason is that the values are relatively smaller than a numerical value of 1,000). As can be realized from the above description, in the heat mapping method of method 1, a display of the detection intensities of the distance measurement sensors in the same installation area is a relative display with the highest value.

The cross-sectional view 36a will be described as an example. In FIGS. 13A to 13C when a single sensor is installed, the intensity level is 10 when the maximum value of the numerical values is 6; however, in the case of 36a, since the maximum value of the numerical values is changed from 6 to 10, the numerical value as an absolute value is not changed from 6, but the intensity level decreases with respect to the current maximum value, and is displayed in a color of a lower intensity level than that in FIGS. 13A to 13C. The merit of method 1 is that strong locations and weak locations in terms of the detection intensity distribution can be relatively realized from the viewpoint of the entire target installation space. The demerit is that when the overlap between the numerical values increases, a location at which the numerical value of the detection intensity has no problem as an absolute value may be seen as being relatively weak.

In FIG. 14C, method 2 will be described with reference to a cross-sectional view 36b. Similar to method 1, it is assumed that colors indicating detection intensities are defined, for example, in 10 levels (levels 1 to 10). The lowest level 1 is set to a numerical value of 0, the highest level 10 is fixed to the numerical value of the maximum value of the intensity distribution when a single distance measurement sensor is used, and even when numerical values exceed the numerical value of the maximum value due to overlapping, the number values are handled as having the same detection intensity. Namely, in method 2, values larger than or equal to a predetermined numerical value are displayed at the same intensity level. It is assumed that if the maximum value of the numerical values is 9, the lowest value of the numerical values is 0, and other numerical values are distributed from 1 to 8, a numerical value of 9 is defined as intensity level 10. Thereafter, when the maximum value of the numerical values is changed to 1,000 due to overlapping, the lowest value of the numerical values is 0, and the other numerical values are not changed from 1 to 8, the intensity level of a maximum value of 1,000 is not changed from the same intensity level 10 as that of a numerical value of 9. Namely, in method 2, a display of the detection intensities of the distance measurement sensors in the same installation area is a display of absolute values that do not exceed the maximum detection intensity in the case of a single distance measurement sensor being installed.

The cross-sectional view 36b will be described as an example. In FIGS. 13A to 13C, the intensity level is 10 when the maximum value of the numerical values is 6; however, in the case of 36b, the maximum value of the numerical values is 10, but since the intensity level 10 is defined as numerical values of 6 or greater, all the numerical values of 6 or greater are displayed at the same intensity level as that of a numerical value of 6. As described above, the merit of method is that even when the overlap increases and thus the numerical values increase, since there is no visual change in detection intensity when the numerical values reach a value or greater, the detection ability of the distance measurement sensor without causing an excessive increase in detection intensity can be evaluated. The demerit is that even when there is a location at which the detection intensity is increased due to overlapping, the increased detection intensity cannot be displayed, and even when the relative detection intensity is changed due to overlapping, a change in relative detection intensity cannot be realized.

In FIG. 14D, method 3 will be described with reference to a cross-sectional view 36c. It is assumed that colors indicating detection intensities are defined, for example, in 10 levels (levels 1 to 10). The lowest level 1 is set to a numerical value of 0, and the highest level 10 is set to the numerical value of the maximum value when one of the distance measurement sensors disposed in the same area is used. In method 3, if a numerical value is calculated as exceeding the maximum value, the new highest level higher than the current highest level 10 is provided, and an intensity level according to the numerical value is displayed. It is assumed that if the maximum value of the numerical values is 9, the lowest value of the numerical values is 0, and other numerical values are distributed from 1 to 8, a numerical value of 9 is defined as the intensity level 10. When the maximum value of the numerical values is changed to 1,000 due to overlapping, the lowest value of the numerical values is 0, and the other numerical values are not changed from 1 to 8, in order to illustrate the intensity level of a square having a maximum value of 1,000 of the numerical values, a new intensity level is defined, and heat mapping is performed. Since there is no change in definition of 10 levels of the numerical values which are originally set, there is no change in display of the intensity levels of numerical values of 1 to 8 of the other squares.

The cross-sectional view 36c will be described as an example. In FIGS. 13A to 13C, the intensity level is 10 when the maximum value of the numerical values is 6; however, in the case of 36c, due to overlapping, a numerical value of 8 and a numerical value of 10 appear as values exceeding a numerical value of 6 which has been the maximum value so far. There is no change in display of the detection intensities of numerical values of 6 or less at which the highest level 10 is defined as 6 before overlapping, only the locations at which the intensity is newly increased due to overlapping are displayed at new intensity levels (in this example, a numerical value of 8 and a numerical value of 10), and the locations at which the intensities are increased due to overlapping are heat mapped. Therefore, it is also possible to display the locations at which the detection intensities are increased due to overlapping, while accurately displaying the actual values of each of the distance measurement sensors, so that method 3 is a method including the merits of method 1 and method 2.

FIGS. 15A to 15C are views describing effects of heat mapping. In the notation method that does not take into consideration the detection intensity distribution as illustrated in FIG. 10B, the detection intensity distribution cannot be visualized, but the distance measurement sensors 1a to 1h are seemed to be able to cover the inside of the area 29 without omissions. However, when the heat mapping described in FIGS. 13A to 14D is applied, the detection intensities are displayed as illustrated in FIG. 15A, and it is possible to visually confirm that a location, such as an area 29a displayed in white color, at which the detection intensity is low is actually generated. In order to make improvement to eliminate the area in which the detection intensity is low, an example in which the distance measurement sensors are disposed to face each other as illustrated in FIG. 10A will be described.

FIG. 15B is an illustration of heat mapping of the case of the face-to-face disposition of FIG. 10A. It can be realized that even in this case, the detection intensity may be low in an area 29b in the vicinity of the center of the two distance measurement sensors 1a and 1b.

Therefore, it is possible to easily confirm that when the positions of the two sensors 1a and 1b are brought close to each other as illustrated in FIG. 15C, the area 29b in which the detection intensity is low is eliminated, and the detection intensity is increased.

As described above, according to the present embodiment, it is possible to figure out an area, in which the detection intensity may be low, on the simulator at the installation stage of the sensors by performing heat mapping in consideration of the overlapping of the detection intensity distributions of the distance measurement sensors. Then, since the sensors are installed to eliminate the area, it is possible to reduce a load on an installation worker for adjustment, or perform optimum installation without being dependent on the installation skill of the worker during installation. In addition, it is possible to perform a more accurate installation simulation by aligning the detection intensities, which are displayed on the simulator, to the specifications of the distance measurement sensor.

Second Embodiment

In a second embodiment, a display of a detection intensity distribution will be described which takes into consideration an influence of an occlusion generated by the distance measurement sensor or an influence of an obstacle.

Figure 16:
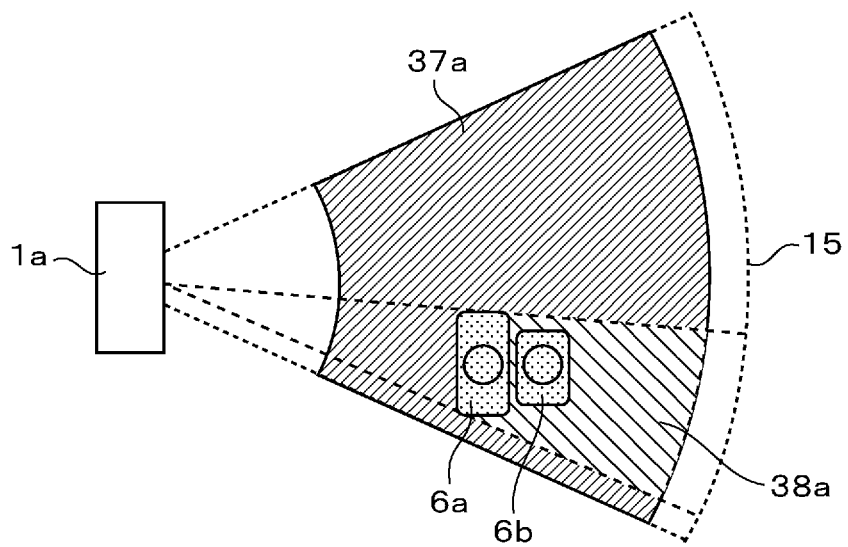
FIG. 16 is a view describing the generation of an occlusion (second embodiment)

FIG. 16 is a view describing the generation of an occlusion. In a case where there is another object 6b behind an object 6a when seen from the distance measurement sensor 1a, the object 6b is hidden by the object 6a, so that the distance measurement sensor 1a cannot detect the object 6b. A phenomenon in which an object is hidden by another object and thus cannot be detected by the distance measurement sensor as described above is referred to as an occlusion. In this example, an area which can be detected by only one distance measurement sensors 1a is denoted by reference sign 37a, and an occlusion is generated in an area 38a having a grid pattern behind the object 6a, and the intensity of detection of the object decreases in the area.

Figure 17:
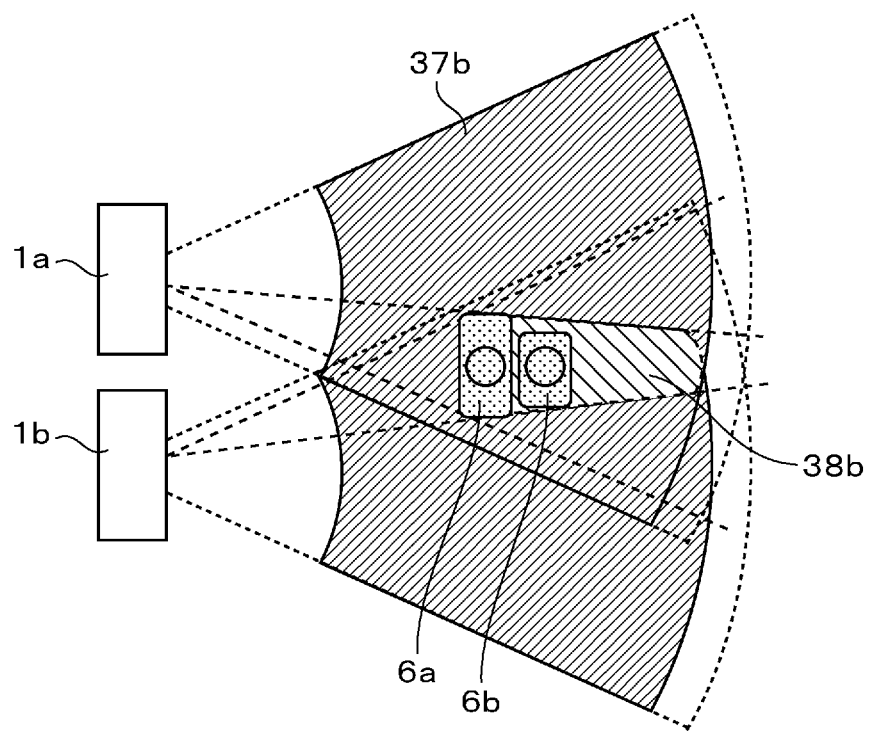
FIG. 17 is a view illustrating an example of an occlusion when a distance measurement sensor is added.

FIG. 17 is a view illustrating an example of an occlusion when a distance measurement sensor is added. The case is such that the distance measurement sensor 1b is added and installed to face the same direction as that of the distance measurement sensor 1a in the state of FIG. 16. In this case, the detectable area is as denoted by reference sign 37b, and an area 38b in which an occlusion is likely to be generated is narrower than the area 38a in FIG. 16, but the area still remains in which the detection intensity decreases.

Figure 18:
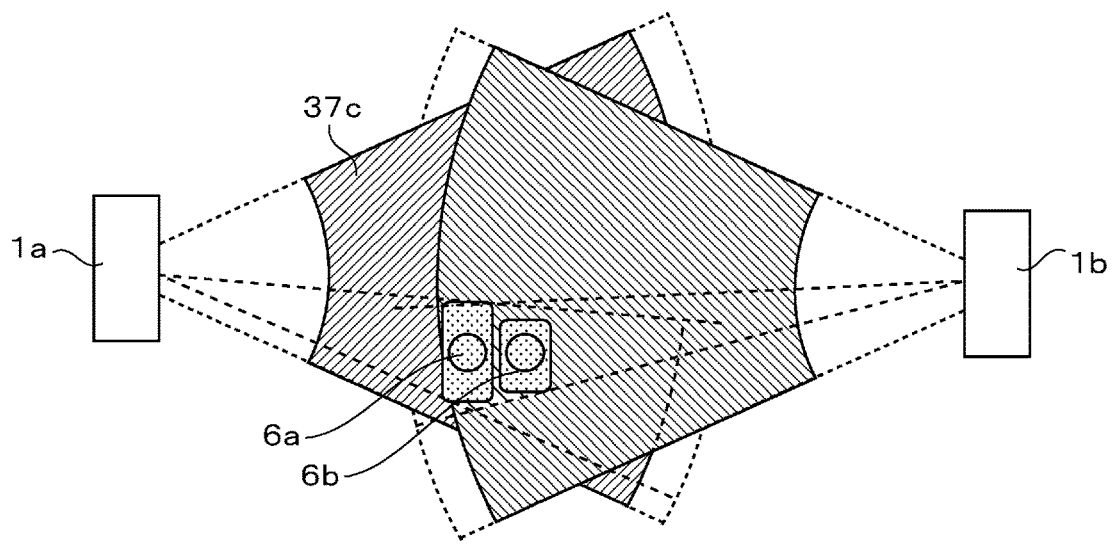
FIG. 18 is a view illustrating an example of an occlusion when a distance measurement sensor is added.

FIG. 18 illustrates a case where the distance measurement sensor 1b is added and installed to face the distance measurement sensor 1a. In this case, the detectable area is as denoted by reference sign 37c, and the area is almost eliminated in which an occlusion is likely to be generated. Therefore, both the objects 6a and 6b arranged forward and rearward can be detected.

It can be said from FIGS. 17 and 18 that the probability of generation of an occlusion changes depending on a method for disposing the distance measurement sensors. Namely, even when the detectable areas of the distance measurement sensors simply overlap each other, depending on the disposition method, it cannot be said that the detection intensity is necessarily improved. Namely, the detection intensity distribution may not be correctly expressed only by simply adding the numerical values as described in FIGS. 14A to 14D.

FIGS. 19A to 19D are views describing a method for improving a detection intensity calculation when distance measurement sensors are added. How to perform calculation according to positions at which the sensors are added as illustrated in FIGS. 19A to 19D will be described.

Figure 19A:
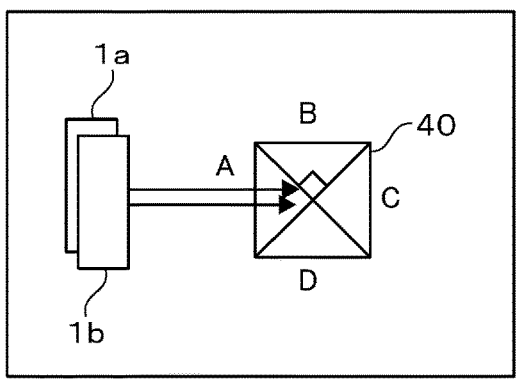
FIGS. 19A to 19D are views describing a method for improving a detection intensity calculation when distance measurement sensors are added.

FIG. 19A illustrates a case where the distance measurement sensor 1*b* is added at substantially the same position as the installation position of the distance measurement sensor 1*a*. The angular difference between two irradiation directions is 0 degrees, and a square (voxel) 40 at the center is irradiated from the same position. Incidentally, in order to facilitate understanding of description, it is assumed that the square 40 at the center is one square (namely, a view of the voxel seen from above) in the cross-sectional view 33 of FIG. 12B, and all the numerical values of the detection intensities given to the squares are "6".

In the example of FIG. 19A, since both the sensors 1*a* and 1*b* emit light toward a surface A, the occlusion described with reference to FIG. 17 is likely to be generated, and the addition of the sensor 1*b* from the same direction does not make much contribution to an improvement in detection intensity. Therefore, in the case of FIG. 19A, the method for simply adding the numerical values of the overlapping squares as described with reference to FIGS. 14A to 14D is not appropriate. As a method for calculating the detection intensity of the sensor 1*a*+ the sensor 1*b*, for example, as illustrated by 6+6×0=6, 6+6×0.1=6.6, or the like, the detection intensity of the sensor 1*b* which is added is multiplied by a certain weighting factor w (in this case, w=0 to 0.1) and then the result is added. In such a manner, it is possible to avoid an excessive improvement in detection intensity in the overlapping of irradiations from the same direction.

Figure 19B:
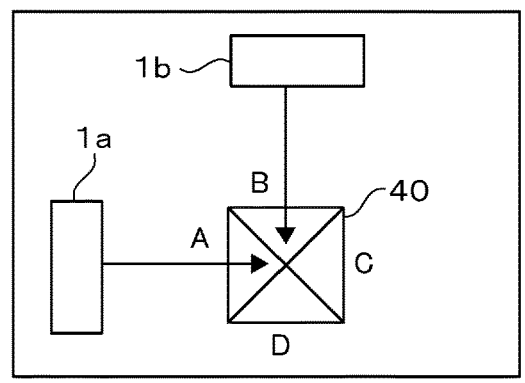

FIG. 19B illustrates a case where the distance measurement sensor 1*b* is added at a position different from the position of the distance measurement sensor 1*a*, the angular difference between the irradiation directions of the two sensors is 90 degrees, and both the sensors emit light toward the square 40 at the center. In this case, since the sensor 1*a* emits light toward the surface A, and the sensor 1*b* emits light toward a surface B, an occlusion is less likely to be generated than in the case of FIG. 19A, and the detection intensity is further improved by the addition of the sensor 1*b* than in the case of FIG. 19A. Therefore, in a method for calculating the detection intensity of the sensor 1*a*+ the sensor 1*b* in FIG. 19B, for example, as illustrated by 6+6×0.3=7.8 or 6+6×0.5=9, the detection intensity of one sensor is multiplied by the weighting factor w (w=0.3 to 0.5) which is larger than that in the case of FIG. 19A, and then the result is added. In such a manner, the detection intensity can be more appropriately improved and quantified by the addition of the distance measurement sensor 1*b* than in the case of FIG. 19A.

Figure 19C:
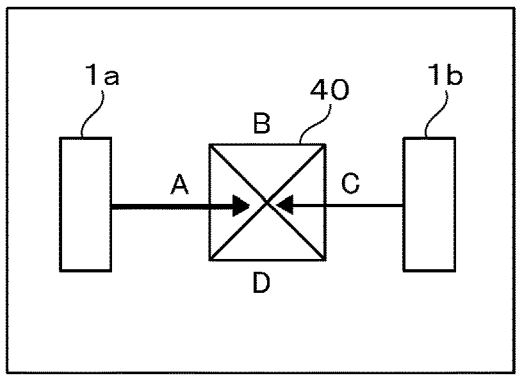

FIG. 19C illustrates a case where the distance measurement sensor 1*b* is installed at a position facing the distance measurement sensor 1*a* via the square 40 at the center, and the square 40 is irradiated with light at an angular difference of 180 degrees between the irradiation directions of the two sensors. In this case, since the sensor 1*a* emits light toward the surface A, and the sensor 1*b* emits light toward a surface C, an occlusion is further less likely to be generated than in the case of FIG. 19B, and the detection intensity is further improved by the addition of the sensor 1*b*. Therefore, in a method for calculating the detection intensity of the sensor 1*a*+ the sensor 1*b* in FIG. 19C, for example, as illustrated by 6+6×0.7=10.2 or 6+6×1.0=12, the detection intensity of one sensor is multiplied by the weighting factor w (w=0.7 to 1.0) which is larger than that in the case of FIG. 19B, and then the result is added. In such a manner, the detection intensity can be more appropriately improved and quantified by the addition of the distance measurement sensor 1*b* than in the case of FIG. 19B.

Figure 19D:
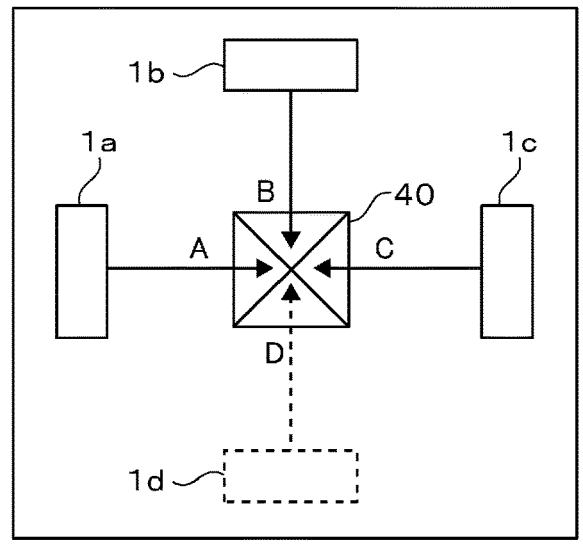

FIG. 19D illustrates a case where three distance measurement sensors are installed. Namely, the case is such that in the state of FIG. 19B, a distance measurement sensor 1*c* is added to have an angular difference of 90 degrees with respect to the distance measurement sensor 1*b*, or a distance measurement sensor 1*d* is added to have an angular difference of 180 degrees with respect to the distance measurement sensor 1*b*, and the three sensors emit light toward the square 40 at the center. As a result, either of the irradiation of the surface A, the surface B, and the surface C of the square 40 with light (pattern 1) and the irradiation of the surface A, the surface B, and a surface D with light (pattern 2) is performed. Since three surfaces are irradiated with light in both the patterns, the intensities of detection of the square 40 in the two patterns should have the same value. Therefore, in a method for calculating detection intensities when the square of which a plurality of surfaces have already been irradiated with light is additionally irradiated with light, in consideration of the surfaces irradiated with light not only by the sensors to be added (1*c* and 1*d*) but also by the sensors (1*a* and 1*b*) which have already been installed, the angular difference between the sensors, and the like, it is necessary to determine a weighting factor to be multiplied to the numerical values of each of the sensors.

Incidentally, the numerical values of the weighting factor or the calculation methods which have been described above are one example, and should be determined according to the specifications of the distance measurement sensor or an installation situation. The important approach is to confirm from which direction the square is irradiated with light and then perform calculation. In addition, in the present embodiment, the square has been described as having four divided surfaces at 90 degrees; however, it is also possible to manage irradiation surfaces such as two surfaces at 180 degrees or 12 surfaces at 30 degrees, determine the weighting factor w, and then perform calculation.

Next, an example of calculating a detection intensity distribution in consideration of the generation of an occlusion will be described.

Figure 20A:
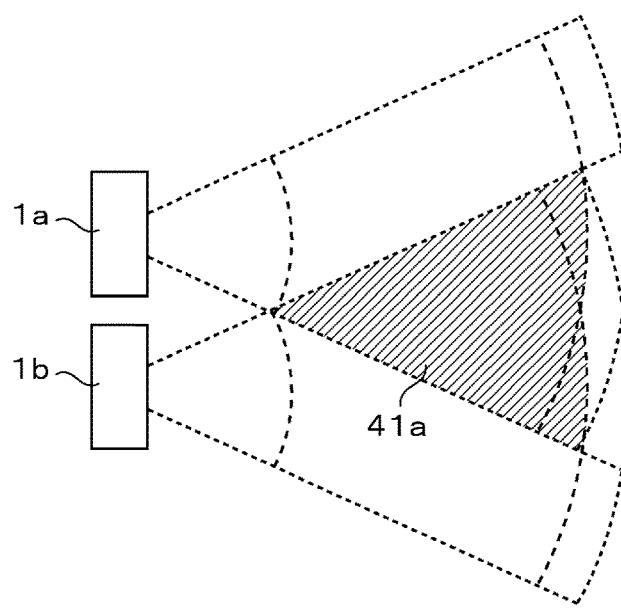
FIGS. 20A and 20B are views illustrating an example of calculating detection intensities when two distance measurement sensors are disposed in parallel.
Figure 20B:
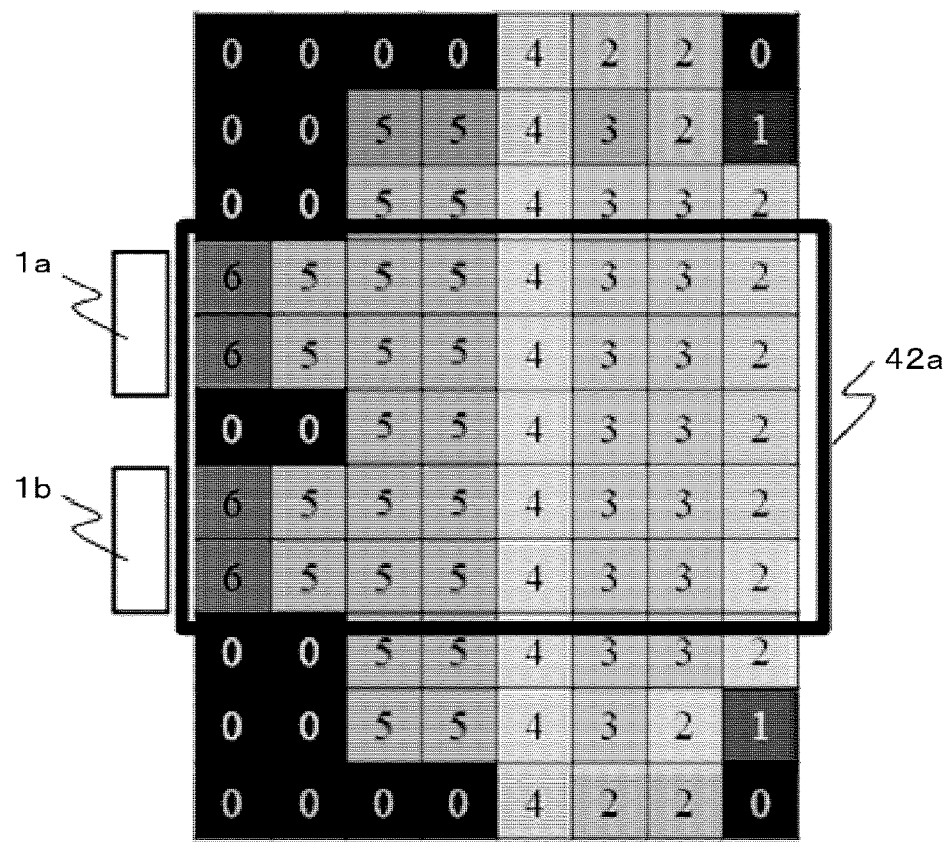

FIGS. 20A and 20B are views illustrating an example of calculating detection intensities when two distance measurement sensors are disposed in parallel. FIG. 20A illustrates the disposition of the sensors, and FIG. 20B illustrates an example of calculating a detection intensity distribution. As illustrated in FIG. 20A, the two distance measurement sensors 1*a* and 1*b* are disposed side by side such that detection areas partly overlap each other. Specifically, the two sensors 1*a* and 1*b* having the detection intensity distribution illustrated in FIGS. 13A to 13C are disposed to have the same overlapping (by five rows) of the detection areas as that in FIG. 14A. In this case, the detection areas of the two sensors overlap each other in a portion indicated by an area 41*a*, and since the disposition is similar to that in FIG. 19A, the generation of an occlusion is expected.

FIG. 20B illustrates a method for calculating an area in which the detection areas overlap each other. The squares in a frame 42*a* correspond to the overlapping area 41*a*. When the sensor 1*a* and the sensor 1*b* emit light from the same direction (irradiation of the same surface of the square 40 with light in FIGS. 19A to 19D), a larger numerical value of two numerical values of the sensors is adopted. Namely, the process is to select a larger numerical value in an OR process of the two numerical values. The results of calculating the overlapping squares according to the process method are numerical values in the frame 42a. It can be realized that the numerical values in the overlapping area are not simply added together when compared to the calculation result of FIGS. 14A to 14D. As described with reference to FIG. 17, the fact that an occlusion is likely to be generated in the disposition in which an object is irradiated with light from the same direction is taken into consideration, so that even when overlapping occurs, the numerical values of the detection intensities are suppressed so as not to become excessively large.

Figure 21A:
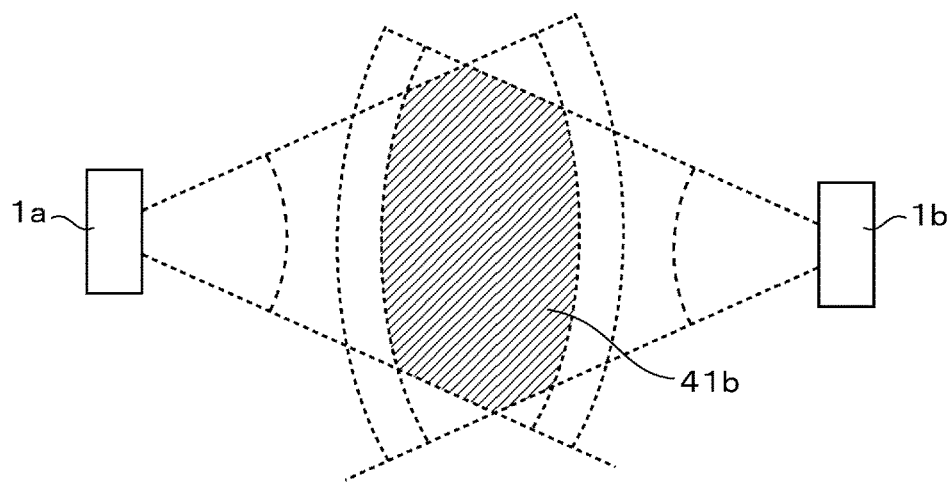
FIGS. 21A to 21C are views illustrating an example of calculating detection intensities when two distance measurement sensors are disposed to face each other.
Figure 21B:
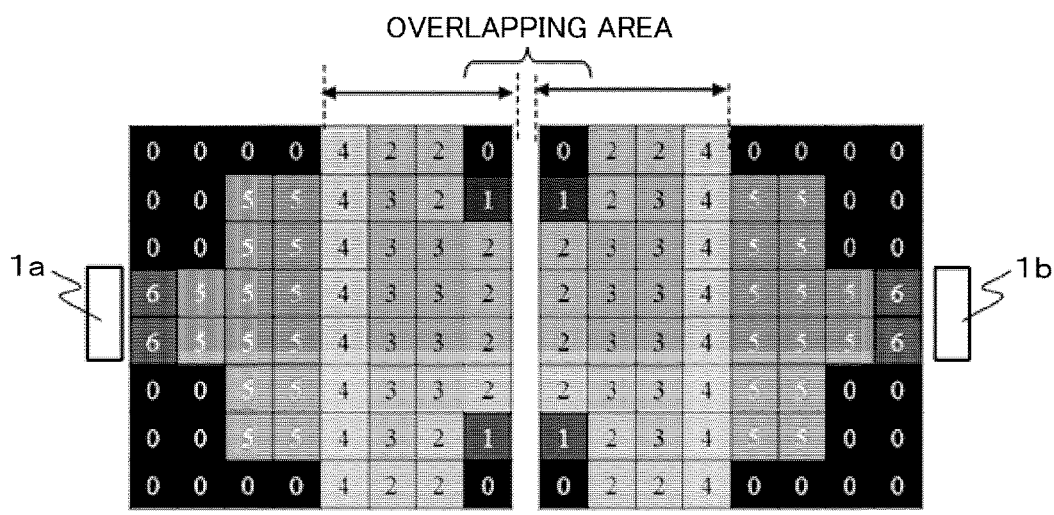
Figure 21C:
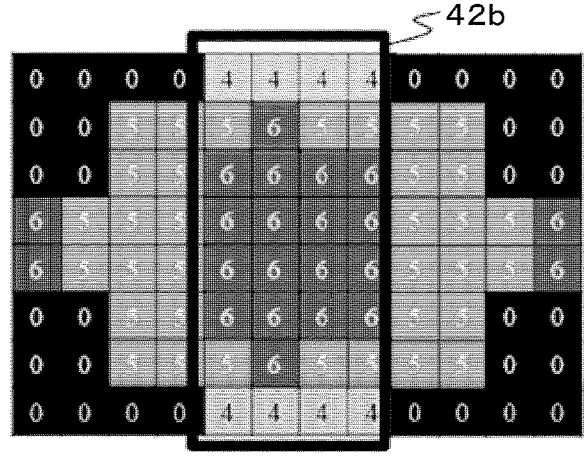

FIGS. 21A to 21C are views illustrating an example of calculating detection intensities when two distance measurement sensors are disposed to face each other. FIG. 21A illustrates the disposition of the sensors, and FIGS. 21B and 21C illustrate an example of calculating a detection intensity distribution. As illustrated in FIG. 21A, the two distance measurement sensors 1a and 1b are disposed to face each other such that detection areas partly overlap each other. Specifically, the two distance measurement sensors 1a and 1b having the detection intensity distribution illustrated in FIGS. 13A to 13C are disposed to face each other in the same manner as in FIG. 18. In this case, an overlapping portion is indicated by an area 41b, and four rows of the squares overlap each other as illustrated in FIG. 21B. Since this disposition is close to the disposition illustrated in FIG. 19C, an occlusion is unlikely to be generated.

FIG. 21C illustrates a method for calculating an area in which the detection areas overlap each other. The squares in a frame 42b correspond to the overlapping area 41b. In the case of irradiation in which the sensor 1a and the sensor 1b face each other, the numerical values are simply added together. The results of calculating the overlapping squares according to the process method are numerical values in the frame 42b. Unlike the calculation result of the frame 42a of FIG. 20B, the numerical values of the overlapping squares are simply added together. It can be realized that as described with reference to FIG. 19C, in the case of disposition of the distance measurement sensors in which an occlusion is unlikely to be generated, the strength of the detection intensities can be expressed by the addition of the numerical values.

Next, a method for displaying a detection intensity distribution when there is an obstacle in a detectable area will be described.

FIG. 22 is a view illustrating a state where there is an obstacle in a detectable area. The distance measurement sensors 1a and 1b are disposed, and there are obstacles (shown in black), such as a wall 43a or columns 43b and 43c of which the movement is not necessary to detect, in the detectable area. When the distribution of detection intensities is displayed in disregard of the obstacles, the following problems occur.

First, even when the obstacle (wall) 43a is high, and completely blocks detection by the distance measurement sensors, quantification is performed in consideration of the overlapping of an overlapping area 44 (hatched portion) which should not be taken into consideration (problem 1). In addition, the numerical values of detection intensities in the areas of the obstacles (columns) 43b and 43c which may not be originally displayed are displayed (problem 2). Further, the occlusion described with reference to FIG. 16 is likely to be generated in areas (grid portions) 38c and 38d behind the obstacles 43b and 43c, and the detection intensities cannot be displayed as being weak in the areas (problem 3). Namely, when the obstacles or an occlusion caused by the obstacles is not taken into consideration, the areas 38c and 38d in which the detection intensity is low cannot be correctly displayed, and the detection intensity distribution on a display of the simulator differs from the actual detection intensity distribution, which is a problem.

FIG. 23 is a view that describes solving the problems illustrated in FIG. 22 and a method for displaying a detection intensity distribution when there is an obstacle. First, regarding problem 1 that "quantification is performed in consideration of the overlapping of the overlapping area 44 which should not be taken into consideration", all the numerical values (additional amount) of the detection intensities in an area behind the obstacle 43a are set to 0. Also regarding problem 2 that "the numerical values of detection intensities in the areas of the obstacles 43b and 43c which may not be originally displayed are displayed", the numerical values of the detection intensities in the areas of the squares corresponding to the obstacles 43b and 43c are set to 0. Finally, also regarding problem 3 that "the detection intensities cannot be displayed as being weak in the areas 38c and 38d in which an occlusion is likely to be generated", the numerical values of the detection intensities of the squares corresponding to the areas 38c and 38d are set to 0 or values lower than the normal values. As described above, it is possible to solve each of the problems, and display the detection intensities closer to the actual detection intensities by quantifying the squares in consideration of blocking by the obstacles or an occlusion.

Next, a problem of interference occurring between a plurality of distance measurement sensors will be described. For example, when a plurality of the TOF sensors are used in the same area at the same time, laser interference occurs to cause a reduction in accuracy of distance data. Normally, in order to prevent interference, pulse patterns different for each TOF sensor are set according to a combination of pulse patterns which do not interfere each other. Therefore, the interference can be suppressed. However, a user may not notice the occurrence of interference caused by a setting error, setting omissions, or the like. Therefore, if the occurrence of interference can be visualized on a screen of the simulator during setting, a setting error or setting omissions are easily found.

FIG. 24 is a view describing a display method when a plurality of the distance measurement sensors 1a and 1b interfere with each other. For example, since interference is likely to occur in an area 45 in which the detection areas of the two sensors installed overlap each other, the area 45 is expressed so as to make a notification to a user in an easy-to-understand manner. In order to make a notification about an interference occurrence area, expression methods are effective, such as "blinking the area 45", "displaying the area 45 in a color different from the color used in the heat map", or "displaying the area 45 in a pattern such as hatching lines" when the area 45 is visualized. In addition, instead of highlighting the area 45 itself, the sensors 1a and 1b may be changed in color or blinked to make a notification to a user. When three or more distance measurement sensors overlap each other, the distance measurement sensors can be checked for interference and displayed.

A procedure for displaying a detection intensity distribution using the distance measurement sensor installation simulator, and suitably installing a plurality of distance measurement sensors according to each of the techniques described above will be described.

Figure 25:
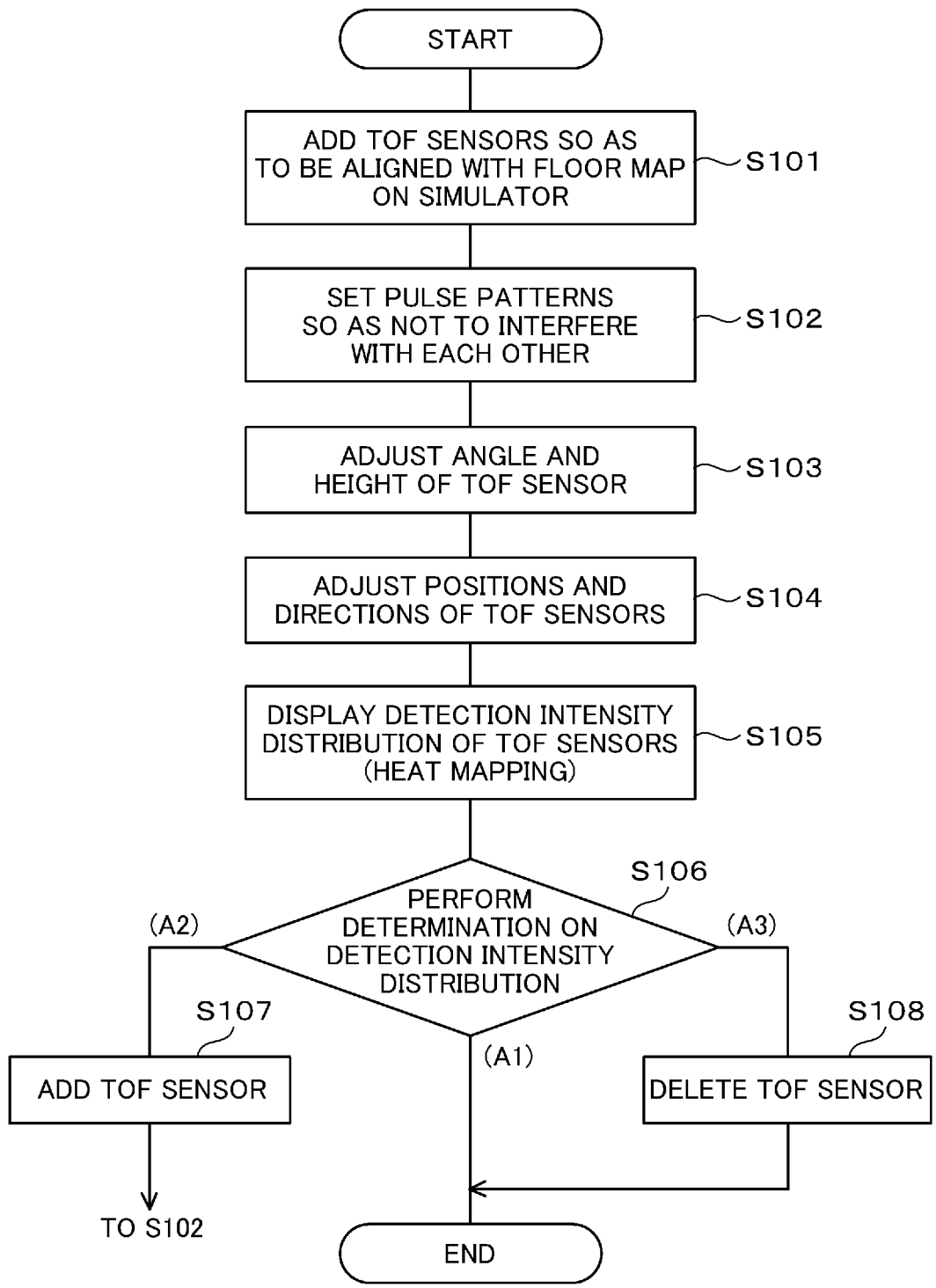
FIG. 25 is a flowchart illustrating a procedure for installing distance measurement sensors.

FIG. 25 is a flowchart illustrating one example of a procedure for installing distance measurement sensors. Here, a description will be given in step order using a TOF sensor as an example of the distance measurement sensor.

S101: An area (for example, a floor map of a store) in which the TOF sensors are to be actually installed is read on the installation simulator, and the TOF sensors are added such that the area which is desired to be detected faces an irradiation orientation.

S102: When a plurality of the TOF sensors are used in the same area at the same time, laser interference occurs to cause a reduction in accuracy of distance data, so that pulse patterns different for each TOF sensor are set so as not to interfere with each other.

S103: In order to align coordinate axes in the TOF sensor to coordinate axes of the actual space according to the physical installation position of the TOF sensor, the angle or the height is adjusted.

S104: In order to connect data, which is acquired by the plurality of TOF sensors, as one line of movement, the positions or the directions of the TOF sensors are aligned to each other. S103 and S104 are referred to as a calibration process, and when the TOF sensors and the installation simulator are actually connected to each other, the display device 2 outputs an instruction to each of the TOF sensors to perform the calibration process.

S105: The detection intensity distribution of each of the TOF sensors is displayed in colors or lights and shades (heat mapped) in consideration of the overlapping of detectable areas or obstacles.

S106: A user performs a determination on the detection intensity distribution displayed on the installation simulator. As a result of the determination, the process branches to (A1) to (A3). First, (A1) indicates a case where there is no problem in the detection intensity distribution, and there is no excess or deficiency in the number of the TOF sensors, and the process ends in this stage.

S107: When the determination result is (A2), and it is determined that there is a weak area in terms of the detection intensity but cannot be adjusted with the current number of the TOF sensors, the TOF sensor is added, and the process returns to S102.

S108: When the determination result is (A3), and it is determined that there is no weak area in terms of the detection intensity and the current number of the TOF sensors is surplus, the TOF sensor which is a surplus is deleted, and the process ends.

As described above, since the detection intensity distribution is displayed using the installation simulator, and a user confirms the detection intensity distribution, the distance measurement sensors can be suitably installed. Particularly, since in the heat mapping display step of S105, the detection intensity distribution is displayed in consideration of an influence of the occlusion or the obstacle discussed in the present embodiment, it is possible to perform a highly accurate display more suitable for the actual measurement environment.

Third Embodiment

In the first and second embodiments, the detection intensity distribution is displayed based on the light intensity, whereas in a third embodiment, a method for displaying a detection intensity with a point cloud number will be described.

FIG. 26 is a view describing that the point cloud number changes depending on the position of the voxel. Light is emitted from a light source 52 in a distance measurement sensor, and voxels are disposed in the range of a viewing angle 54 of the distance measurement sensor. In order to facilitate description, some voxels (size is determined by a designer) in a measurement range are extracted and denoted by 55a, 55b, and 55c. A case is assumed in which four light rays (travelling directions of light are indicated by arrows) are emitted from the light source 52.

As can be seen from the drawing, the voxel 55a located closest to the light source 52 is irradiated with all the four light rays 53, the voxel 55b located next is irradiated with two light rays, and the voxel 55c located farthest therefrom is irradiated with only one light ray. Therefore, it can be realized that the number of the light rays 53 with which the voxel is irradiated changes according to the distance from the light source 52. As described above, the closer the voxel is to the light source 52, the larger the number of the light rays 53 (arrows of light) hitting the voxel is, in other words, the number of point clouds (=point cloud number) captured by the distance measurement sensor is increased. Meanwhile, the farther the voxel is from the light source 52, the smaller the number of the light rays hitting the voxel is, namely, the number of point clouds (=point cloud number) captured by the distance measurement sensor is decreased.

Figure 27:
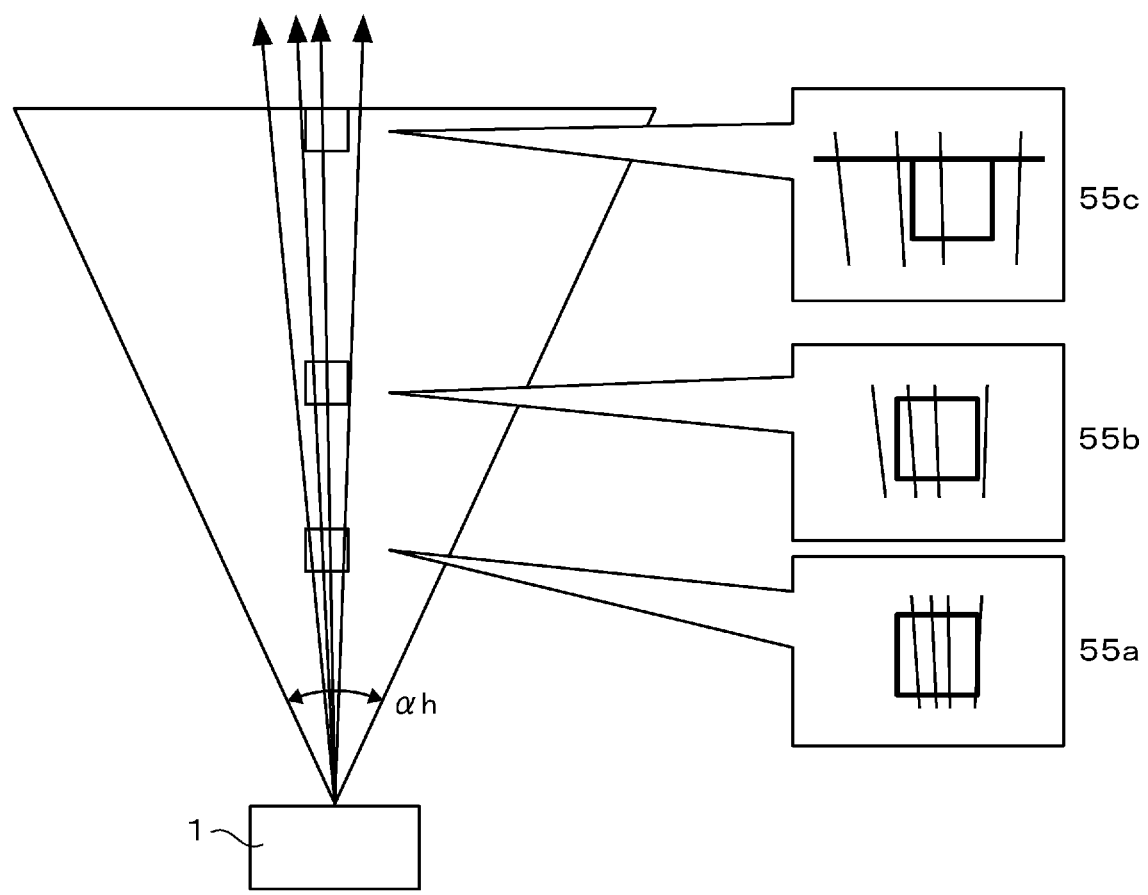
FIG. 27 is a view describing that the point cloud number changes depending on the position of the voxel.

FIG. 27 is a view of the state of the light rays of FIG. 26 when seen from above. Light is emitted in the range of the horizontal angle $\alpha h$ of view, and the number of the light rays incident on each of the voxels 55a, 55b, and 55c (number of intersection points between an incident surface and the light rays) is illustrated. As the same as in FIG. 26, the number of the light rays at the voxels are 4, 2, and 1, respectively, and it can be realized that as the distance from the light source increases, the number of point clouds (point cloud number) captured by the distance measurement sensor decreases.

Figure 28:
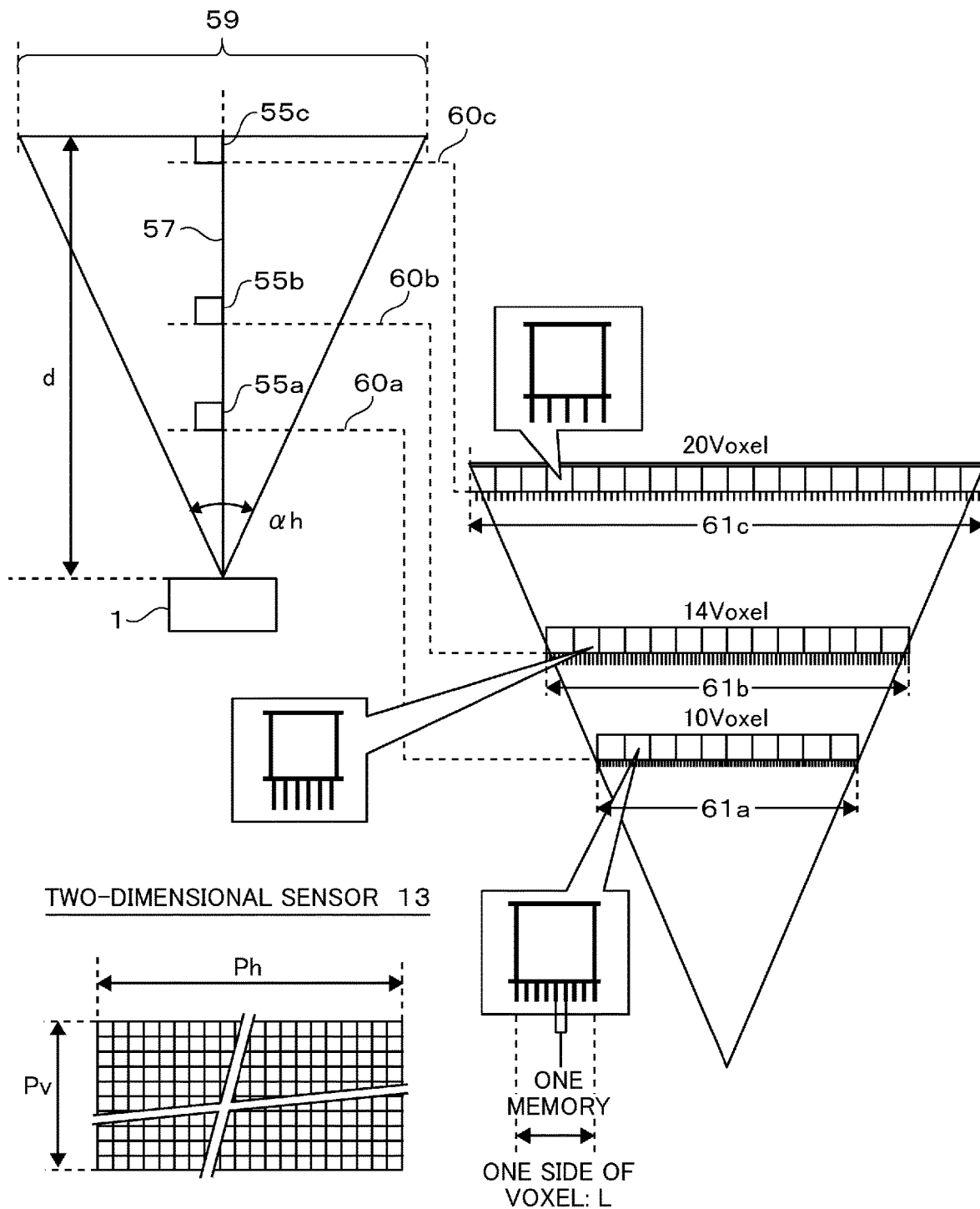
FIG. 28 is a detailed view describing a relationship between the position of the voxel and the point cloud number.

FIG. 28 is a view further describing FIGS. 26 and 27 in detail. The drawing is a view when the distance measurement sensor 1 is seen from above, and a line vertically extending from the light source is defined as 57, the distance to each of the voxels 55a, 55b, and 55c is defined as d, and the horizontal viewing angle is defined as $\alpha h$. Other voxels adjacent to the voxel 55a on a line 60a perpendicular to the line 57 are arranged side by side at the position of the voxel 55a in the range of the viewing angle. Then, as illustrated in an enlarged view on the right side of the drawing, the voxels arranged side by side on the line 60a forms a voxel row 61a, and in this example, the number of the voxels is 10. Similarly, voxel rows 61b and 61c illustrated on lines 60b and 60c are formed at the positions of the voxels 55b and 55c, respectively, and the numbers of the voxels included in the voxel rows are 14 and 20, respectively. Incidentally, the above number of the voxels is the number of the voxels in a plane at a height from the floor surface.

Light reflected by an object is received by the two-dimensional sensor 13 (refer to FIG. 3) illustrated in the lower left of the drawing. When a horizontal pixel number Ph of the two-dimensional sensor 13 is assumed to be 80 pixels, the range of the voxel row 61a is received by the 80 pixels in a horizontal direction. The number of the voxels in the voxel row 61a is 10, and light is received by 80 pixels/10 pieces (=eight pixels, and equivalent to eight memories in the drawing) per one voxel. The number of the pixels receiving light is referred to as a "point cloud equivalent number", and the object in the voxel can be expressed by the point cloud equivalent number (8 pieces in this example). Similarly, since the number of the voxels in the range of the voxel row 61b is 14, the object is expressed by 80 pixels/14 pieces (=approximately 5.7 pixels, equivalent to 5.7 memories in the drawing, and a point cloud equivalent number of 5.7) per one voxel. Since the number of the voxels in the voxel row 61c is 20, the object is expressed by 80 pixels/20 pieces (=four pixels, equivalent to four memories in the drawing, and a point cloud equivalent number of 4) per one voxel. Therefore, when the distance from the distance measurement sensor increases, the number of the pixels (point cloud equivalent number and memory number) for expressing one voxel decreases.

The statement that the point cloud number as an index for expressing the object 6 decreases means that the detection intensity level decreases. In the description of FIGS. 11A to 13C in the first embodiment, the case has been described in which the detection intensity is quantified in the intensity of light reaching the voxel; however, as described with reference to FIGS. 26 and 27 in the present embodiment, it can be realized that the point cloud number per one voxel is also greatly related to the detection intensity.

Therefore, as another technique of quantifying the detection intensity, a method for expressing the detection intensity in the point cloud number per voxel is effective. The only difference from the technique of using the light intensity is the quantifying method, and the heat mapping, namely, the technique of visualizing numerical values is the same. Hereinafter, a method for quantifying a point cloud number will be described in detail. First, how to quantify a point cloud number per one voxel will be described.

Again, in FIG. 28, a range 59 of a straight line, which is the length of the voxel row, is $2*d*\tan(\alpha h/2)$ using the distance d from the distance measurement sensor and the horizontal viewing angle $\alpha h$. A length Mh (horizontal direction) of one memory in the range indicated by each of the voxel rows 61a, 61b, and 61c can be calculated by $Mh=(2*d*\tan(\alpha h/2))/Ph$ using the horizontal pixel number Ph. Further, when the length of one voxel is defined as L, a point cloud equivalent number Nh per one voxel in the horizontal direction can be calculated by $Nh=L/Mh$.

In addition, although not illustrated, a point cloud equivalent number Nv per one voxel in a vertical direction can also be similarly calculated. A length Mv of one memory in the vertical direction is $Mv=(2*d*\tan(\alpha v/2))/Pv$, and a point cloud equivalent number Nv per one voxel in the vertical direction is $Nv=L/Mv$ from the vertical viewing angle $\alpha v$ of the distance measurement sensor and a vertical pixel number Pv of the two-dimensional sensor 13. Therefore, a point cloud equivalent number N per irradiation surface of one voxel can be calculated by multiplying the point cloud equivalent numbers in the horizontal direction and the vertical direction as in $N=Nh*Nv$.

Here, when it assumed that the horizontal pixel number Ph of the two-dimensional sensor 13 is 80 pixels and the vertical pixel number Pv is 40 pixels (half of the horizontal pixel number Ph), since Nh=8 and Nv=4, the point cloud equivalent number of one voxel on the line 60a is N=8*4=32 in the scale illustrated in FIG. 28. In addition, the point cloud equivalent number of one voxel on the line 60c is similarly calculated to be N=4*2=8. The calculation examples are one example, and if the distance d from the distance measurement sensor, the size L of the voxel, and the viewing angle $\alpha$ are known, the point cloud equivalent number can be quantified, and similar to the method for quantifying the light intensity, it is possible to quantify the detection intensity per one voxel.

As described above, two types of the quantifying methods for illustrating the detection intensities use the "light intensity" and the "point cloud number" in the voxel, and the detection intensities can be quantified no matter what method is used. Further, as another method, the two quantifying methods can be combined to quantify and use the product of both parameters, namely, "light intensity×point cloud number" as an index. The method will be described below.

For example, when it is assumed that the point cloud equivalent number given to a voxel on the line 60a is 32 and the numerical value of light intensity is 9, the product of both parameters is calculated as 32*9=288. In addition, when it is assumed that the point cloud equivalent number given to a voxel on the line 60c is 8 and the numerical value of light intensity is 3, the product is calculated as 8*3=24. It can be realized from the results that since a voxel in a short distance has strong light intensity and a large point cloud number, the numerical value is changed in a strengthening direction by the product of both parameters, and since a voxel in a far distance has weak light intensity and a small point cloud number, the numerical value is changed in a weakening direction by the product of both parameters. Incidentally, the above calculation is one example, and it is preferable that actually, the numerical value is multiplied by a weighting factor or the like to be quantified according to the actual situation.

As described above, the method for expressing the detection intensity in the point cloud number described in the present embodiment can be replaced with the expression method using the light intensity described in the first and second embodiments, or combined with the expression method using the light intensity, and similarly used. The effects can also be similarly obtained.

As described above, according to each of the embodiments, it is possible to provide the distance measurement system and the method for displaying the detection intensity distribution of the distance measurement sensors, which can reduce a work load on an installation worker and easily carry out installation work by quantifying the detection intensities in the unit of voxel according to the distance from the distance measurement sensor, and heat mapping the detection intensities in consideration of the irradiation directions, obstacles, or the like.

The invention can be applied to a sensor which measures the distance, such as a LiDAR, a RADAR, or an ultrasonic sensor of which the detection intensity changes according to the distance between the distance measurement sensor and an object.

What is claimed is:

1. A distance measurement system in which a plurality of distance measurement sensors are installed to detect an object in a measurement area, wherein each of the distance measurement sensors detects the object based on a transmission time of light, the system comprising:
   a detection intensity distribution display device including a computer and a display coupled to the computer, the computer configured to:
   generate respective detection intensity distributions for each of the detectable areas of each distance measurement sensor based on numerical values A each decreasing as a distance from each of the distance measurement sensors increases,
   display, on the display, colors or lights and shades indicating the generated detection intensity distributions based on magnitudes of the numerical values of the generated intensity distributions,
   wherein at least two of the detectable areas of the plurality of distance measurement sensors overlap each other, and the computer is configured to multiply the numerical values A at an overlapping location by a weighting factor to perform addition on the numerical values A to generate the detection intensity distributions, and wherein the computer is configured to change the weighting factor according to an incident angle and a number of incident rays of the light from each of the distance measurement sensors, the object being irradiated with the light.

2. The distance measurement system according to claim 1, wherein each of the numerical values A is a numerical value A1 obtained by quantifying a light intensity according to the distance from each of the distance measurement sensors, the light intensity being emitted from the distance measurement sensor.

3. The distance measurement system according to claim 1, wherein each of the numerical values A is a numerical value A2 obtained by quantifying a point cloud number according to the distance from each of the distance measurement sensors, the point cloud number being generated by the light emitted from the distance measurement sensor.

4. The distance measurement system according to claim 1, wherein each of the numerical values A is a numerical value A3 calculated using both of a numerical value A1 obtained by quantifying a light intensity according to the distance from each of the distance measurement sensors, the light intensity being emitted from the distance measurement sensor, and a numerical value A2 obtained by quantifying a point cloud number according to the distance from each of the distance measurement sensors, the point cloud number being generated by the light emitted from the distance measurement sensor.

5. The distance measurement system according to claim 1, wherein the computer is configured to assign a maximum numerical value after the addition to a maximum level of display levels of the colors or the lights and shades.

6. The distance measurement system according to claim 1, wherein if a maximum value of numerical values of the detection intensities when the detectable areas do not overlap each other is assumed to be a numerical value B, the computer is configured to define a range of numerical values assigned to a maximum level of display levels of the colors or the lights and shades as the numerical value B or greater.

7. The distance measurement system according to claim 1, wherein if a maximum value of numerical values of the detection intensities when the detectable areas do not overlap each other is assumed to be a numerical value B, when results of the addition are the numerical value B or greater, the computer is configured to not change a definition of the colors or the lights and shades which are existing, add and define a new color or light and shade, and display a detection intensity distribution of the numerical value B or greater in the added definition.

8. The distance measurement system according to claim 1, wherein the computer is configured to define numerical values of detection intensities in an area of an obstacle and an area, in which the light is blocked by the obstacle, as 0, define display levels of the colors or the lights and shades as a lowest level.

9. The distance measurement system according to claim 1, wherein the computer is configured to:
acquire installation information about a vertical angle, a horizontal angle, and a height of each of the distance measurement sensors,
set specifications such as an angle of view, an irradiable distance, and a light source of each of the distance measurement sensors,
define a front space as a cube, and divide the cube into a plurality of voxels,
quantify a light intensity of the light that reaches each of the voxels after being emitted from each of the distance measurement sensors, or a point cloud number of each of the voxels, and
extract a plane of the cube, and display the plane in colors or lights and shades according to magnitudes of the numerical values A.

10. A method for displaying a detection intensity distribution of a distance measurement sensor when a plurality of distance measurement sensors are installed to detect an object in a measurement area, wherein each of the distance measurement sensors detects the object based on a transmission time of light, the method comprising:
generating respective detection intensity distributions for each of the detectable areas of each distance measurement sensor based on numerical values A, each decreasing as a distance from each of the distance measurement sensors increases; and
displaying, on a display, colors or lights and shades indicating the generated detection intensity distributions based on magnitudes of the numerical values of the generated intensity distributions,
wherein at least two of the detectable areas of the plurality of distance measurement sensors overlap each other, and the computer is configured to multiply the numerical values A at an overlapping location by a weighting factor to perform addition on the numerical values A to generate the detection intensity distributions, and
wherein the computer is configured to change the weighting factor according to an incident angle and a number of incident rays of the light from each of the distance measurement sensors, the object being irradiated with the light.

11. The method for displaying a detection intensity distribution of a distance measurement sensor according to claim 10,
wherein each of the numerical values A calculated in the quantifying step is a numerical value A1 obtained by quantifying a light intensity according to the distance from each of the distance measurement sensors, the light intensity being emitted from the distance measurement sensor.

12. The method for displaying a detection intensity distribution of a distance measurement sensor according to claim 10,
wherein each of the numerical values A calculated in the quantifying step is a numerical value A2 obtained by quantifying a point cloud number according to the distance from each of the distance measurement sensors, the point cloud number being generated by the light emitted from the distance measurement sensor.

13. The method for displaying a detection intensity distribution of a distance measurement sensor according to claim 10,
wherein each of the numerical values A calculated in the quantifying step is a numerical value A3 calculated using both of a numerical value A1 obtained by quantifying a light intensity according to the distance from each of the distance measurement sensors, the light intensity being emitted from the distance measurement sensor, and a numerical value A2 obtained by quantifying a point cloud number according to the distance from each of the distance measurement sensors, the point cloud number being generated by the light emitted from the distance measurement sensor.

14. The method for displaying a detection intensity distribution of a distance measurement sensor according to claim 10, wherein in the visualizing step, a maximum numerical value after the addition is assigned to a maximum level of display levels of the colors or the lights and shades.

15. The method for displaying a detection intensity distribution of a distance measurement sensor according to claim 10, wherein if a maximum value of numerical values of the detection intensities when the detectable areas do not overlap each other is assumed to be a numerical value B, in the visualizing step, a range of numerical values assigned to a maximum level of display levels of the colors or the lights and shades are defined as the numerical value B or greater.

16. The method for displaying a detection intensity distribution of a distance measurement sensor according to claim 10, wherein if a maximum value of numerical values of the detection intensities when the detectable areas do not overlap each other is assumed to be a numerical value B, in the visualizing step, when results of the addition are the numerical value B or greater, a definition of the colors or the lights and shades which are existing is not changed, a new color or light and shade is added and defined, and a detection intensity distribution of the numerical value B or greater is visualized in the added definition.

17. The method for displaying a detection intensity distribution of a distance measurement sensor according to claim 10, wherein in the quantifying step and the visualizing step, numerical values of detection intensities in an area of an obstacle and an area, in which the light is blocked by the obstacle, are defined as 0, display levels of the colors or the lights and shades are defined as a lowest level, and visualization is performed.

\* \* \* \* \*